US012556074B2

United States Patent
Ko et al.

(10) Patent No.: US 12,556,074 B2
(45) Date of Patent: Feb. 17, 2026

(54) CONSEQUENT POLE-TYPE INTERIOR PERMANENT MAGNET SYNCHRONOUS MOTOR

(71) Applicant: SAMSUNG ELECTRONICS CO., LTD., Suwon-si (KR)

(72) Inventors: Byoungsoo Ko, Suwon-si (KR); Hyungchul Lee, Suwon-si (KR); Junseok Kim, Suwon-si (KR); Hongseok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 18/131,540

(22) Filed: Apr. 6, 2023

(65) Prior Publication Data
US 2023/0246529 A1 Aug. 3, 2023

Related U.S. Application Data

(63) Continuation of application No. PCT/KR2021/013498, filed on Oct. 1, 2021.

(30) Foreign Application Priority Data

Oct. 20, 2020 (KR) .......... 10-2020-0136319

(51) Int. Cl.
*H02K 1/27* (2022.01)
*H02K 1/276* (2022.01)
*H02K 21/14* (2006.01)

(52) U.S. Cl.
CPC .......... *H02K 21/14* (2013.01); *H02K 1/2766* (2013.01); *H02K 2213/03* (2013.01)

(58) Field of Classification Search
CPC .. H02K 21/14; H02K 1/2766; H02K 2213/03; H02K 1/2746; H02K 1/276; H02K 21/12
See application file for complete search history.

(56) References Cited

U.S. PATENT DOCUMENTS 9,667,107 B2 5/2017 Yamada et al.
10,298,078 B2 5/2019 Yokoyama et al.
(Continued)

FOREIGN PATENT DOCUMENTS

CN 107147227 A 9/2017
CN 109831081 A 5/2019
(Continued)

OTHER PUBLICATIONS

International Search Report dated Jan. 21, 2022 issued in PCT Application No. PCT/KR2021/013498.
(Continued)

*Primary Examiner* — Thomas Truong
(74) *Attorney, Agent, or Firm* — STAAS & HALSEY LLP

(57) ABSTRACT

A consequent pole type interior permanent magnet synchronous motor includes a stator; a rotor rotatable inside the stator; a plurality of permanent magnets inside the rotor; and a plurality of slits formed along a radial direction of the rotor such that the plurality of slits are each between a respective two adjacent permanent magnets among the plurality of permanent magnets. The number of a plurality of consequent poles formed in the rotor by the plurality of permanent magnets is smaller than the number of the plurality of permanent magnets.

18 Claims, 18 Drawing Sheets

(56) References Cited

U.S. PATENT DOCUMENTS

| | | | |
|---|---|---|---|
| 10,714,992 | B2 | 7/2020 | Mikami et al. |
| 11,114,909 | B2 | 9/2021 | Yamada et al. |
| 11,177,704 | B2 | 11/2021 | Yoon et al. |
| 11,342,802 | B2 | 5/2022 | Shimokawa et al. |
| 2008/0272667 | A1 | 11/2008 | Ionel et al. |
| 2010/0308680 | A1 | 12/2010 | Yamada et al. |
| 2012/0001509 | A1 | 1/2012 | Yamada et al. |
| 2014/0265703 | A1 | 9/2014 | Yamada et al. |
| 2018/0269733 | A1* | 9/2018 | Mikami .................. H02K 3/28 |
| 2018/0367000 | A1 | 12/2018 | Mikami et al. |
| 2019/0006898 | A1 | 1/2019 | Yokoyama et al. |
| 2019/0036399 | A1 | 1/2019 | Yamada et al. |
| 2019/0379248 | A1 | 12/2019 | Yoon et al. |
| 2021/0135520 | A1 | 5/2021 | Shimokawa et al. |
| 2021/0367463 | A1* | 11/2021 | Yamada ................. H02K 21/16 |

FOREIGN PATENT DOCUMENTS

| | | | |
|---|---|---|---|
| CN | 110994839 | | 4/2020 |
| CN | 111162614 | A | 5/2020 |
| JP | 2012-34520 | | 2/2012 |
| JP | 2015-96001 | | 5/2015 |
| JP | 2015096001 | A * | 5/2015 |
| JP | 2017-28977 | | 2/2017 |
| JP | 6589624 | | 10/2019 |
| JP | 6607029 | | 11/2019 |
| JP | 6657928 | | 3/2020 |
| JP | 6711159 | | 6/2020 |
| KR | 10-2019-0139444 | | 12/2019 |
| KR | 10-2020-0030565 | | 3/2020 |
| KR | 10-2020-0101586 | | 8/2020 |

OTHER PUBLICATIONS

Written Opinion dated Jan. 21, 2022 issued in PCT Application No. PCT/KR2021/013498.

Korean Office Action issued in counterpart Korean Application No. 10- 2020-0136319 dated Feb. 20, 2025.

* cited by examiner

FIG. 7

| Ps_mech [°,MECHANICAL ANGLE] | Pm_mech [°,MECHANICAL ANGLE] | Ps_elec [°,ELECTRICAL ANGLE] | Pm_elec [°,ELECTRICAL ANGLE] | BACK ELECTROMOTIVE FORCE(BACK EMF) [V] | NOTE |
|---|---|---|---|---|---|
| 0.0 | 60.0 | 0.0 | 180.0 | 46.45 | NO SLIT |
| 0.28 | 60.0 | 0.8 | 180.0 | 48.53 | |
| 0.47 | 60.0 | 1.4 | 180.0 | 49.50 | |
| 0.57 | 60.0 | 1.7 | 180.0 | 49.88 | |
| 0.66 | 60.0 | 2.0 | 180.0 | 50.22 | |
| 0.75 | 60.0 | 2.3 | 180.0 | 50.52 | |
| 0.85 | 60.0 | 2.5 | 180.0 | 50.78 | |
| 0.94 | 60.0 | 2.8 | 180.0 | 51.02 | |
| 1.88 | 60.0 | 5.7 | 180.0 | 52.50 | |
| 2.82 | 60.0 | 8.5 | 180.0 | 53.24 | |
| 3.76 | 60.0 | 11.3 | 180.0 | 53.70 | |
| 4.70 | 60.0 | 14.1 | 180.0 | 54.01 | BACK EMF MAX |
| 5.64 | 60.0 | 16.9 | 180.0 | 53.80 | |
| 6.12 | 60.0 | 18.4 | 180.0 | 53.53 | |
| 6.59 | 60.0 | 19.8 | 180.0 | 53.01 | |
| 7.06 | 60.0 | 21.2 | 180.0 | 52.51 | |
| 7.54 | 60.0 | 22.6 | 180.0 | 51.95 | |
| 8.01 | 60.0 | 24.0 | 180.0 | 51.39 | |
| 8.48 | 60.0 | 25.5 | 180.0 | 50.80 | |
| 8.96 | 60.0 | 26.9 | 180.0 | 50.18 | |
| 9.44 | 60.0 | 28.3 | 180.0 | 49.55 | |
| 9.91 | 60.0 | 29.7 | 180.0 | 48.88 | |
| 10.39 | 60.0 | 31.2 | 180.0 | 48.24 | |
| 10.87 | 60.0 | 32.6 | 180.0 | 47.55 | |
| 11.35 | 60.0 | 34.0 | 180.0 | 46.88 | |
| 11.58 | 60.0 | 34.8 | 180.0 | 46.45 | BACK EMF EQUIVALENT |
| 11.82 | 60.0 | 35.5 | 180.0 | 46.20 | |
| 12.30 | 60.0 | 36.9 | 180.0 | 45.51 | |
| 12.79 | 60.0 | 38.4 | 180.0 | 44.80 | |
| 13.27 | 60.0 | 39.8 | 180.0 | 44.07 | BACK EMF REDUCTION |
| 13.75 | 60.0 | 41.3 | 180.0 | 43.31 | |
| 14.24 | 60.0 | 42.7 | 180.0 | 42.58 | |
| 14.72 | 60.0 | 44.2 | 180.0 | 41.81 | |
| 15.21 | 60.0 | 45.6 | 180.0 | 41.06 | |

CONSEQUENT POLE-TYPE INTERIOR PERMANENT MAGNET SYNCHRONOUS MOTOR

CROSS-REFERENCE TO RELATED APPLICATION(S)

This application is a continuation application, under 35 U.S.C. § 111(a), of international application No. PCT/KR2021/013498, filed on Oct. 1, 2021, which claims priority under 35 U.S.C. § 119 to Korean Patent Application No. 10-2020-0136319, filed on Oct. 20, 2020, the disclosures of which are incorporated herein by reference in their entirety.

BACKGROUND

Field

The disclosure relates to a consequent poly type interior permanent magnet motor having consequent poles.

Description of Related Art

Generally, in an interior permanent magnet motor, a plurality of permanent magnets are embedded inside a rotor at regular intervals.

A consequent pole type interior permanent magnet motor may be used to reduce the number of permanent magnets used in a rotor of an interior permanent magnet motor.

The consequent pole type interior permanent magnet motor may reduce the number of permanent magnets by replacing some of the permanent magnets of the general interior permanent magnet motor with the consequent poles using a phenomenon in which the iron core of the rotor between two adjacent permanent magnets is magnetized, that is, the phenomenon in which the consequent pole is formed in the rotor.

FIG. 1 is a view illustrating a consequent pole type interior permanent magnet motor according to the prior art.

Referring to FIG. 1, the consequent pole type interior permanent magnet motor 100 according to the prior art is a 6-pole motor, and a rotor includes three permanent magnets and three consequent poles formed between the three permanent magnets.

The general 6-pole interior permanent magnet motor includes 6 permanent magnets. Therefore, the number of permanent magnets 112 used in the consequent pole type interior permanent magnet motor 100 according to the prior art is reduced by half compared to that of the general interior permanent magnet motor.

However, the consequent pole type interior permanent magnet motor 100 according to the prior art has the advantage of reducing the amount of permanent magnets 112 used by reducing the number of permanent magnets 112 by half, but due to the structure in which the permanent magnets having the same polarity are disposed in the rotor, a phenomenon in which a rotating shaft coupled to the rotor is magnetized occurs. At this time, both ends of the rotating shaft are magnetized with the same polarity.

The magnetization of the rotating shaft makes it easy for metal foreign substances to be attached to the rotating shaft in the motor assembly process, and this may adversely affect the quality and reliability of the motor. Therefore, the magnetization of the rotating shaft needs to be minimized as much as possible.

In addition, the consequent pole type interior permanent magnet motor according to the prior art generates a large second harmonic component of back electromotive force EMF due to structural characteristics. The harmonic component of the back EMF is a factor that affects iron loss and increases loss of the motor, thereby reducing the output and efficiency of the motor.

SUMMARY

According to an aspect of the disclosure, a consequent pole type interior permanent magnet motor may include a stator; a rotor rotatable inside the stator; a plurality of permanent magnets inside the rotor; and a plurality of slits formed in a radial direction of the rotor such that the plurality of slits are each between a respective two adjacent permanent magnets among the plurality of permanent magnets. A number of consequent poles formed in the rotor by the plurality of permanent magnets may be less than a number of the plurality of permanent magnets.

Each of the plurality of slits may be centered between the respective two adjacent permanent magnets.

Each of the plurality of slits may be formed so that an end thereof adjacent to an outer circumferential surface of the rotor passes through a region of the rotor between the respective two adjacent permanent magnets.

Each of the plurality of slits may be formed such that a first end adjacent to an outer circumferential surface of the rotor and a second end adjacent to a shaft hole of the rotor are blocked.

The first end of each of the plurality of slits may be located closer to the outer circumferential surface of the rotor than one end of each of the respective two adjacent permanent magnets.

Each of the plurality of slits may be formed in a rectangular cross-section.

An electrical angle of a slit pitch of each of the plurality of slits may satisfy $0° < Ps\_elec < 34.8°$.

A width Wb of a bridge between one end of each of the plurality of slits and the outer circumferential surface of the rotor may satisfy a relationship as follows:

$$Ct \leq Wb \leq 0.4 \text{ mm}$$

$$Sl \leq (Do-Di)/2 - Wb*2$$

Wherein Ct is a thickness of a rotor core (0.25 mm~0.35 mm), Wb is the width of the bridge, Sl is a length of the slit, Do is an outer diameter of the rotor core, and Di is an inner diameter of the rotor core.

A width Wr of a rib between one side surface of each of the plurality of slits and one end of a magnet insertion hole of the rotor may satisfy a relationship as follows:

$$Ct \leq Wr \leq 0.4 \text{ mm}$$

$$Sl \leq (Do-Di)/2 - Wr*2$$

Wherein Ct is a thickness of a rotor core (0.25 mm to 0.35 mm), Wr is a width of the rib, Sl is a length of the slit, Do is an outer diameter of the rotor core, and Di is an inner diameter of the rotor core.

The stator may be a concentrated winding type.

The respective two adjacent permanent magnets may be symmetrically arranged with respect to a corresponding slit among the plurality of slits.

The two adjacent permanent magnets may have different polarities from each other.

A flux barrier may be at both ends of each of the plurality of permanent magnets.

The plurality of permanent magnets may be formed in a plate shape or a C-type.

The plurality of permanent magnets may be formed of ferrite or rear earth element.

According to another aspect of the disclosure, a consequent pole type interior permanent magnet motor may include a stator formed in a concentrated winding type; a rotor rotatable inside the stator; a plurality of permanent magnets inside the rotor; a rotating shaft at a center of the rotor; and a plurality of slits formed in a radial direction of the rotor. The plurality of slits may be formed such that the plurality of slits are each centered between a respective two adjacent permanent magnets among the plurality of permanent magnets.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a table showing results obtained by simulating a change in back electromotive force according to a slit pitch of a rotor in a consequent pole type interior permanent magnet motor according to an embodiment of the disclosure by using a finite element method;

DETAILED DESCRIPTION

Various embodiments described below are shown by way of example to assist understanding of the disclosure, and it should be understood that the disclosure may be variously modified and implemented differently from the embodiments described herein. However, in the following description of the disclosure, when it is determined that a detailed description of a related known function or components may unnecessarily obscure the gist of the disclosure, the detailed description and specific illustration thereof will be omitted. Further, in the accompanying drawings, the dimensions of some components may be arbitrarily exaggerated and not drawn to scale in order to aid understanding of the disclosure.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, a consequent pole type interior permanent magnet motor according to an embodiment of the disclosure will be described in detail with reference to the accompanying drawings.

The disclosure has been developed in order to overcome the above drawbacks and other problems associated with the conventional arrangement. An aspect of the disclosure relates to a consequent pole type interior permanent magnet motor capable of reducing magnetization of a rotating shaft and second harmonics of back electromotive force.

With a consequent pole type interior permanent magnet motor according to an embodiment of the disclosure having the above-described structure, an amount of magnetization of a rotating shaft and a second harmonic component of a back electromotive force may be reduced.

In addition, with a consequent pole type interior permanent magnet motor according to an embodiment of the disclosure, an unbalance between an amount of magnetic flux leaked to a stator by a permanent magnet and an amount of magnetic flux leaked to the stator by a consequent pole may be resolved and a back electromotive force may be increased.

Figure 1:
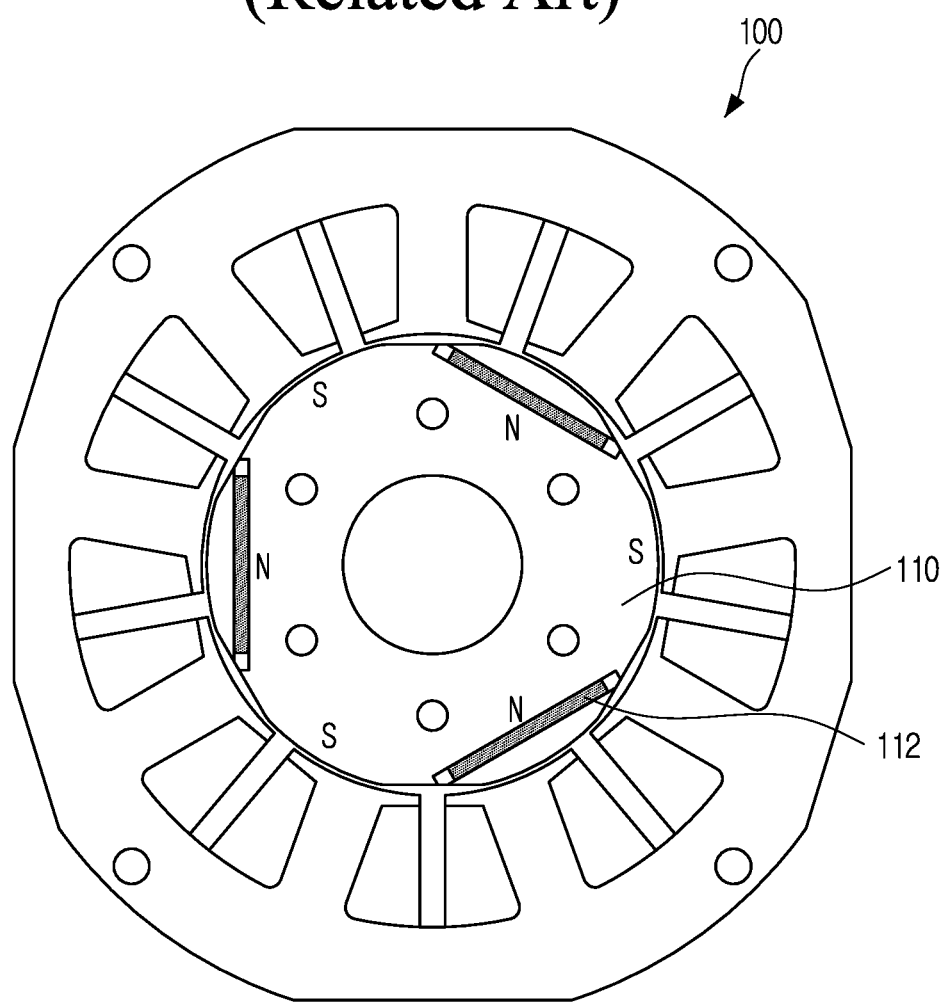
FIG. 1 is a cross-sectional view illustrating a consequent pole type interior permanent magnet motor according to the prior art.
Figure 2:
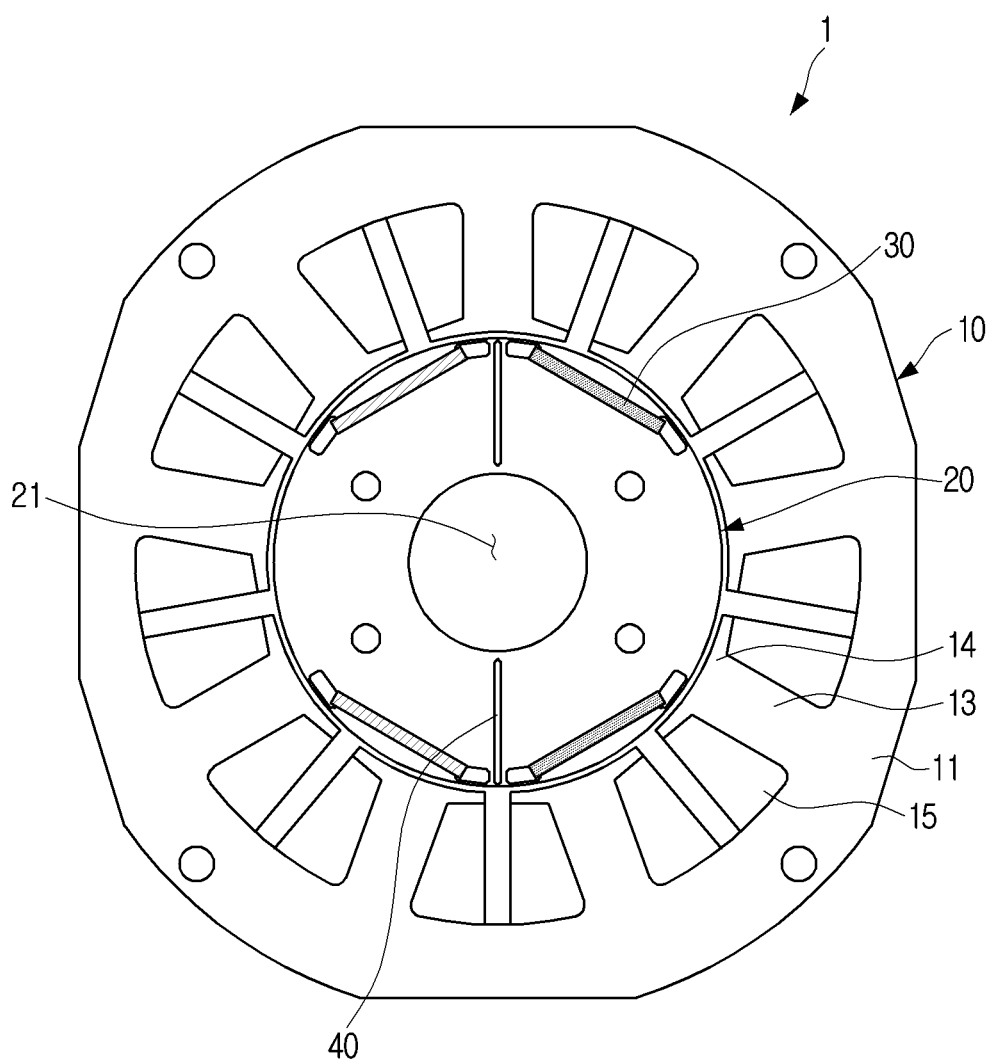
FIG. 2 is a cross-sectional view illustrating a consequent pole type interior permanent magnet motor according to an embodiment of the disclosure.
Figure 3:
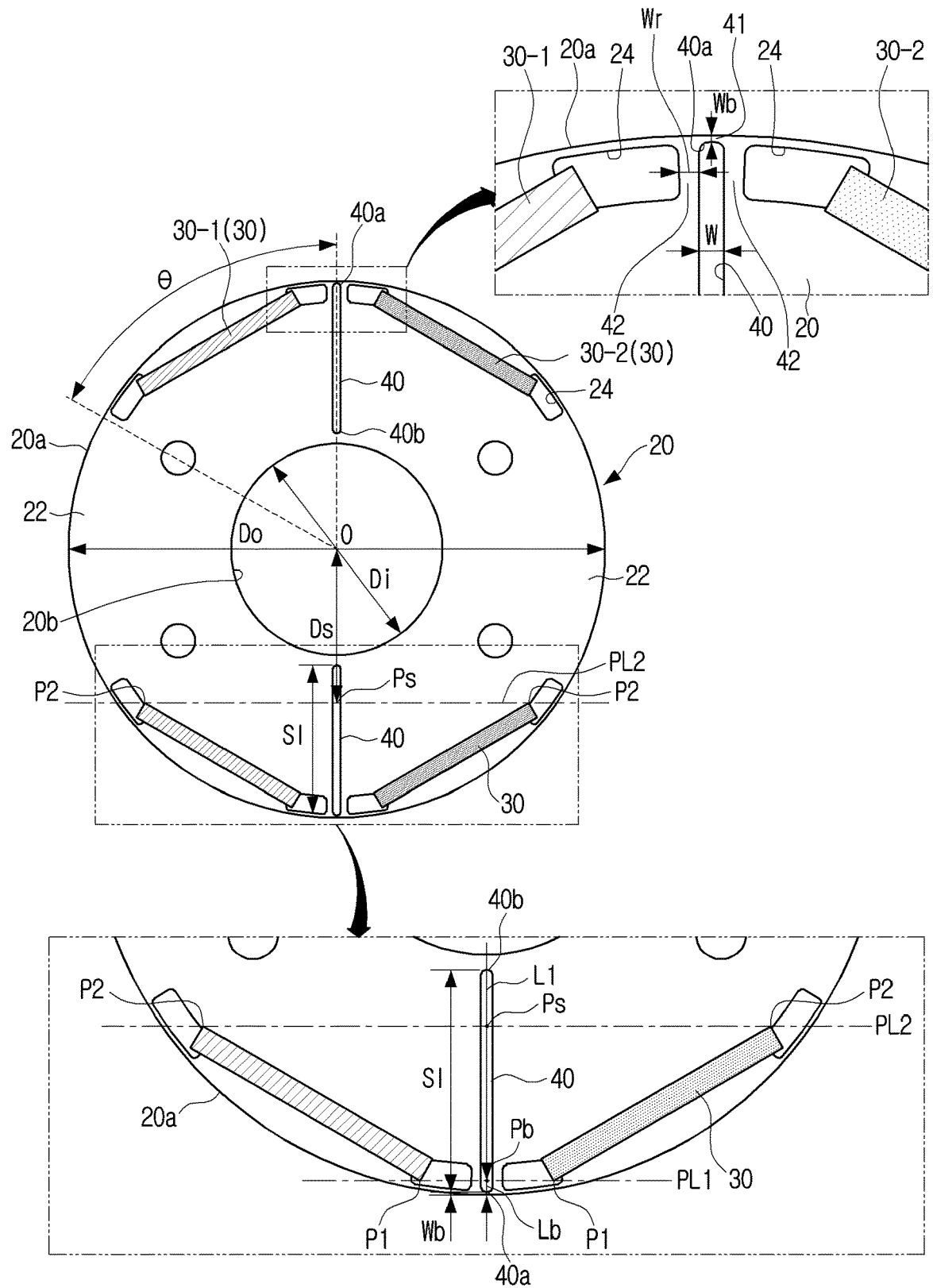
FIG. 3 is a cross-sectional view illustrating a rotor of a consequent pole type interior permanent magnet motor according to an embodiment of the disclosure.
Figure 4:
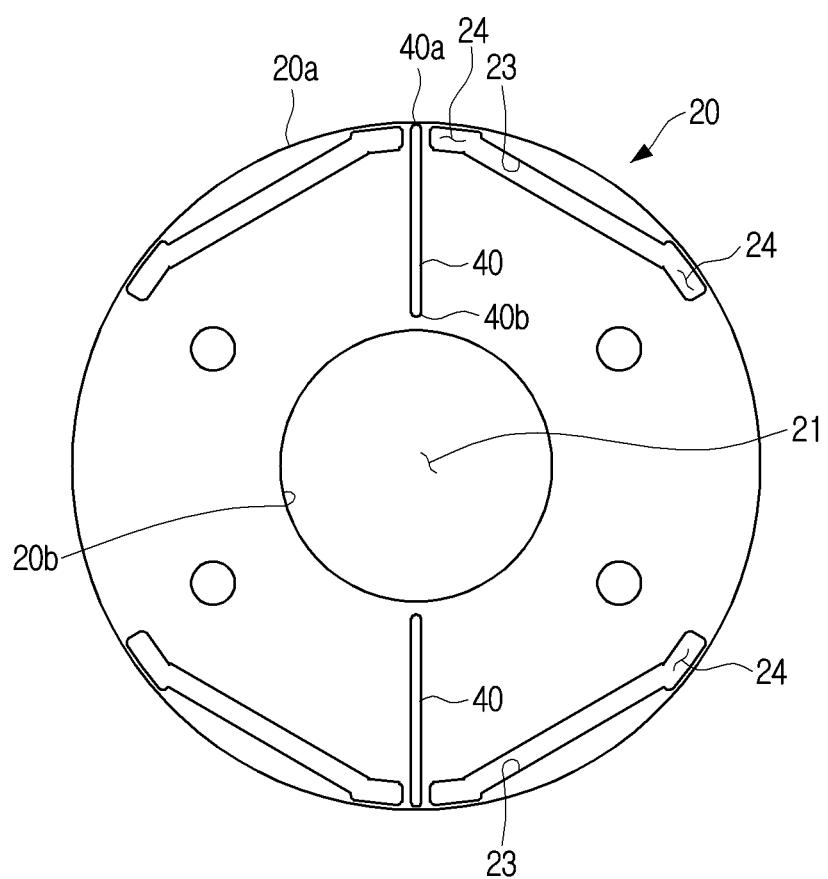
FIG. 4 is a cross-sectional view illustrating a rotor of a consequent pole type interior permanent magnet motor according to an embodiment of the disclosure without permanent magnets.

FIG. 2 is a cross-sectional view illustrating a consequent pole type interior permanent magnet motor according to an embodiment of the disclosure. FIG. 3 is a cross-sectional view illustrating a rotor of a consequent pole type interior permanent magnet motor according to an embodiment of the disclosure. FIG. 4 is a cross-sectional view illustrating a rotor of a consequent pole type interior permanent magnet motor according to an embodiment of the disclosure without permanent magnets.

Referring to FIG. 2, a consequent pole type interior permanent magnet motor 1 according to an embodiment of the disclosure may include a stator 10 and a rotor 20.

The stator 10 may include a yoke portion 11 having a cylindrical inner surface and a plurality of teeth 13 protruding from the inner surface of the yoke portion 11 toward the center of the stator 10.

The plurality of teeth 13 are disposed at regular intervals in the circumferential direction of the inner surface of the stator 10, and a plurality of slots in which coils 15 are accommodated may be formed between the plurality of teeth 13. The coils 15 are intensively wound around each of the plurality of teeth 13. In other words, the stator 10 may be formed as a concentrated winding type stator.

The rotor 20 is formed in a cylindrical shape and is rotatably disposed concentrically with the stator 10. The rotor 20 may be disposed to rotate about the center of the stator 10 at a predetermined distance from the leading ends 14 of the teeth 13 of the stator 10. To this end, a shaft hole 21 into which a rotating shaft 50 (see FIG. 9) is disposed may be formed at the center of the rotor 20.

A plurality of permanent magnets 30 are disposed inside the rotor 20. In detail, the plurality of permanent magnets 30 are disposed between the outer circumferential surface of the rotor 20 and the shaft hole 21.

As illustrated in FIGS. 2 and 3, the plurality of permanent magnets 30 may be formed in an I-shape, that is, a flat plate shape. In addition, the plurality of permanent magnets 30 may be formed of a rare earth element, for example, neodymium Nd. In another embodiment, the plurality of permanent magnets may be formed of ferrite.

The rotor 20 is formed of an iron core, and as illustrated in FIG. 4, a plurality of magnet insertion holes 23 in which the permanent magnets 30 are disposed may be formed in the iron core of the rotor 20 in the circumferential direction of the rotor 20. The plurality of magnet insertion holes 23 may be formed in an I-shape to correspond to the shape of the permanent magnets 30.

The plurality of permanent magnets 30 are arranged in the rotor 20 so that two adjacent permanent magnets 30-1 and 30-2 have different polarities. When the plurality of permanent magnets 30 including a plurality of permanent magnet sets in which two permanent magnets 30-1 and 30-2 having different polarities constitute one permanent magnet set are disposed in the rotor 20, the iron core portion of the rotor 20 between the two permanent magnet sets is magnetized to form a plurality of consequent poles (iron core poles) 22 in the rotor 20.

In detail, the iron core portion between two permanent magnets 30-1 and 30-1 or 30-2 and 30-2 that are far apart from each other and have the same polarity is magnetized to form the consequent pole 22. For example, when the plurality of permanent magnets 30 are arranged in the order of an N-pole permanent magnet 30-1, an S-pole permanent magnet 30-2, the iron core portion 22, an S-pole permanent magnet 30-2, an N-pole permanent magnet 30-1, and the iron core portion 22, the portion 22 of the rotor 20 between two permanent magnets 30-1 and 30-1 or 30-2 and 30-2 having the same polarity, that is, the portion of the iron core is magnetized with a polarity opposite to that of the two permanent magnets 30-1 and 30-1 or 30-2 and 30-2. An example in which the rotor 20 is magnetized is shown in FIG. 5.

Figure 5:
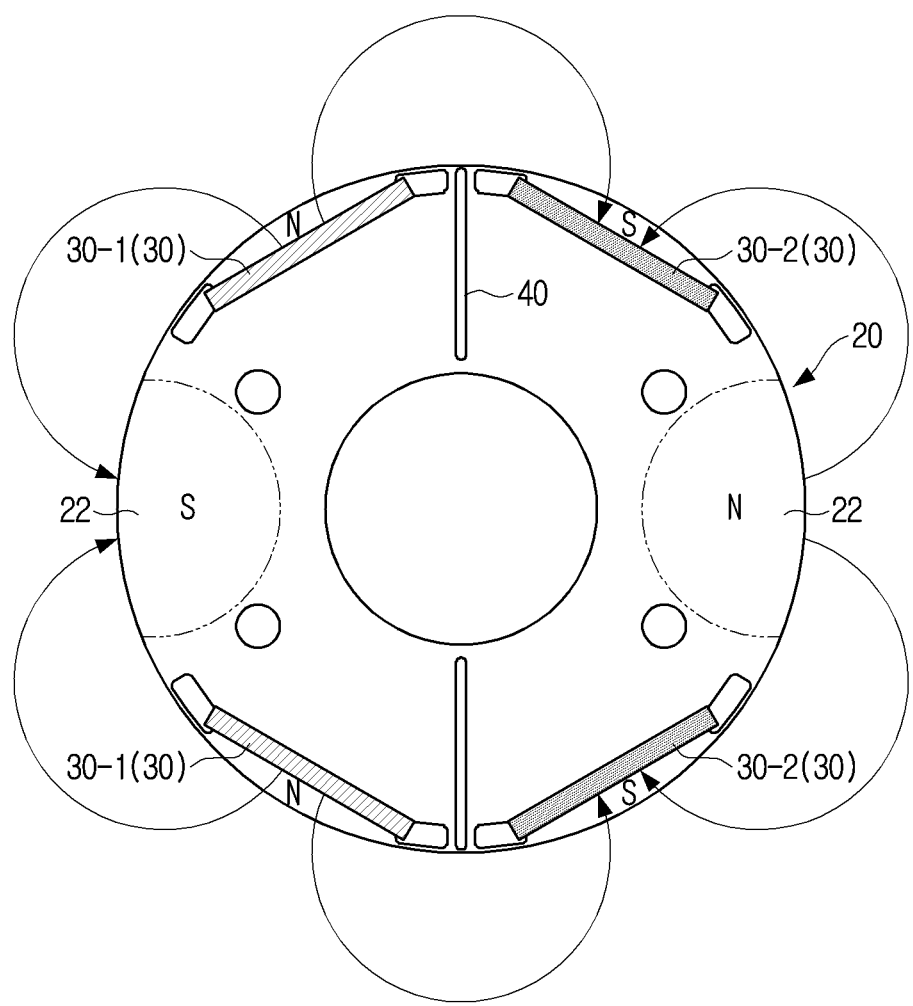
FIG. 5 is a view illustrating a magnetized state of a rotor of a consequent pole type interior permanent magnet motor according to an embodiment of the disclosure.

FIG. 5 is a view illustrating a magnetized state of a rotor of a consequent pole type interior permanent magnet motor according to an embodiment of the disclosure.

In the case of the embodiment shown in FIG. 5, two N-pole permanent magnets 30-1 and two S-pole permanent magnets 30-2 are inserted into the rotor 20. Therefore, the iron core portion 22 between the N-pole permanent magnet 30-1 and the N-pole permanent magnet 30-1 is magnetized to the S-pole to form an S pole consequent pole, and the iron core portion 22 between the S-pole permanent magnet 30-2 and the S-pole permanent magnet 30-2 is magnetized to the N-pole to form an N pole consequent pole. In other words, the iron core portion 22 between the two permanent magnets 30-1 and 30-1 or 30-2 and 30-2 that are far apart from each other and have the same polarity may be magnetized with a polarity different from that of the two adjacent permanent magnets, thereby forming the consequent pole.

Therefore, when a permanent magnet having different polarity is not disposed between two permanent magnets 30 having the same polarity in the rotor 20, the same magnetic field as that of the interior permanent magnet motor according to the prior art in which the permanent magnet having different polarity is disposed between two permanent magnets 30 having the same polarity may be formed.

The number of magnetic poles (or the number of poles) of the rotor 20 includes the number of permanent magnets 30 and the number of consequent poles 22. For example, as illustrated in FIG. 5, when four permanent magnets 30 are disposed in the rotor 20, two consequent poles 22 are formed between the two permanent magnets 30 having the same polarity, so that the number of magnetic poles of the rotor 20 is six (6).

Therefore, in the consequent pole type interior permanent magnet motor 1 according to this embodiment, the number of consequent poles 22 is smaller than the number of permanent magnets 30 disposed in the rotor 20. Because the rotor 20 of the six pole interior permanent magnet motor 1 illustrated in FIG. 5 includes four permanent magnets 30 and two consequent poles 22, the number of permanent magnets 30 is $2/3$ of the number of magnetic poles of the rotor 20, and the number of consequent poles 22 is $1/3$ of the number of magnetic poles of the rotor 20.

In addition, the consequent pole type interior permanent magnet motor 1 according to this embodiment may be formed so that a pole arc angle satisfies the following relationship.

$$\theta = 360°/P$$

Here, θ is the polar arc angle, and P is the number of magnetic poles of the rotor.

Accordingly, the polar arc angle of the 6-pole consequent pole type interior permanent magnet motor 1 according to an embodiment of the disclosure as illustrated in FIG. 5 is 60 degrees.

Referring to FIGS. 3 and 4 again, the rotor 20 may include a plurality of slits 40.

Each of the plurality of slits 40 may be formed between two adjacent permanent magnets 30-1 and 30-2 among the plurality of permanent magnets 30 in the radial direction of the rotor 20.

Two permanent magnets 30-1 and 30-2 having different polarities may be disposed with the slit 40 interposed therebetween. The distance between the two adjacent permanent magnets 30-1 and 30-2 having different polarities and having the slit 40 interposed therebetween may be shorter than the distance between the two permanent magnets 30-1 and 30-1 or 30-2 and 30-2 having the same polarity.

The slit 40 may be formed to be located in the center between two adjacent permanent magnets 30-1 and 30-2. For example, the slit 40 may be formed between two adjacent magnet insertion holes 23. The two magnet insertion holes 23 may be formed to be line symmetric with respect to the slit 40. Accordingly, the two permanent magnets 30-1 and 30-2 inserted into the magnet insertion holes 23 are also line symmetric with respect to the slit 40.

A flux barrier 24 may be provided at both ends of the magnet insertion hole 23 adjacent to the outer circumferential surface 20a of the rotor 20. Thus, the flux barrier 24 may be provided between the slit 40 and one end of the permanent magnet 30.

The flux barrier 24 may be formed in a void that is adjacent to the outer circumferential surface 20a of the rotor 20 and provided in the circumferential direction of the rotor 20. In other words, the flux barrier 24 may have a predetermined width and length and may be formed along the outer circumferential surface 20a of the rotor 20. The flux barrier 24 may be not open toward the leading end of the stator 10.

The flux barrier 24 may be formed to communicate with the magnet insertion hole 23. Therefore, when the permanent magnet 30 is inserted into the magnet insertion hole 23, both ends of the permanent magnet 30 are located in the flux barriers 24, respectively.

The slit 40 is formed in the radial direction of the rotor 20, and may include a first end 40a adjacent to the outer circumferential surface 20a of the rotor 20 and a second end 40b adjacent to the shaft hole 21 of the rotor 20. In other words, the first end 40a of the slit 40 may be formed to be located closer to the outer circumferential surface 20a of the rotor 20 than one end of each of the two adjacent permanent magnets.

The first end 40a of the slit 40 may be formed to be blocked without being opened to the outer circumferential surface 20a of the rotor 20, and the second end 40b of the slit 40 may be formed to be blocked without being opened to the inner circumferential surface 20b of the rotor 20. Thus, there may be the iron core forming the outer circumferential surface 20a of the rotor 20 between the first end 40a of the slit 40 and the outer circumferential surface 20a of the rotor 20. In addition, there may be the iron core forming the inner circumferential surface 20b of the rotor 20 between the second end 40b of the slit 40 and the inner circumferential surface 20b of the rotor 20.

The first end 40a of the slit 40 may be formed to penetrate the rotor region between the two adjacent permanent magnets 30-1 and 30-2. That is, the slit 40 may be formed to penetrate the iron core region of the rotor 20 between the two adjacent magnet insertion holes 23. In other words, the first end 40a of the slit 40 may be located in the same position as the side surface of the magnet insertion hole 23 adjacent to the outer circumferential surface 20a of the rotor 20 or may be closer to the outer circumferential surface 20a of the rotor 20 rather than the side surface of the magnet insertion hole 23. Therefore, the side surface of the slit 40 faces one end of the magnet insertion hole 23.

When the flux barrier 24 is provided at one end of the magnet insertion hole 23, the side surface of the slit 40 may face the flux barrier 24.

The slit 40 may be formed in a long and narrow shape. For example, the slit 40 may be formed in a rectangular cross-section. As another example, the slit 40 may be formed in a long elliptical shape, track shape, and the like. Here, the length of the slit 40 refers to the length of the direction facing the outer circumferential surface 20a of the rotor 20 from the shaft hole 21 of the rotor 20.

When the slit 40 is located at the center between the two adjacent permanent magnets 30 and formed to have a length that can penetrate the range of the rotor 20 between the two adjacent permanent magnets 30, the magnetic resistance increases so that the magnetic flux leaked between the two adjacent permanent magnets 30 may be minimized.

Hereinafter, the dimensional relationship between a bridge 41 and a rib 42 provided between the slit 40 and the magnet insertion hole 23 will be described in detail with reference to FIG. 3.

In FIG. 3, the iron core region between the first end 40a of the slit 40 and the outer circumferential surface 20a of the rotor 20 is referred to as the bridge 41, and the iron core region between one side surface of the slit 40 and one end of the flux barrier 24 of the magnet insertion hole 23 is referred to as the rib 42. When the flux barrier 24 is not provided at one end of the magnet insertion hole 23, the iron core region between the one side surface of the slit 40 and one end of the magnet insertion hole 23 may be referred to as the rib 42.

In order to minimize the magnetic flux leaked between the two adjacent permanent magnets 30, the first end 40a of the slit 40 may be formed to be as close as possible to the outer circumferential surface 20a of the rotor 20, and the length of the slit 40 may be formed as long as possible.

For example, the first end 40a of the slit 40 adjacent to the outer circumferential surface 20a of the rotor 20 may be formed to be closer to the outer circumferential surface 20a of the rotor 20 than the lower corners P1 and P1 of the two adjacent permanent magnets 30.

In detail, the first end 40a of the slit 40 adjacent to the outer circumferential surface 20a of the rotor 20 may be formed to be located at the same position as a first intersection point Pb where a virtual straight line PL1 connecting the lower corners P1 and P1 of the two adjacent permanent magnets 30 and a virtual straight line L1 dividing the slit 40 into two halves in the longitudinal direction intersect at right angles, or closer to the outer circumferential surface 20a of the rotor 20 than the first intersection point Pb. Here, the lower corner P1 of the permanent magnet 30 refers to the corner of the permanent magnet 30 closest to the outer circumferential surface 20a of the rotor 20 among the two corners of the permanent magnet 30 adjacent to the side surface of the slit 40.

Therefore, the width Wb of the bridge 41, which is the distance between the first end 40a of the slit 40 and the outer circumferential surface 20a of the rotor 20, may be formed to satisfy the following relationship.

$$Wb \leq Lb$$

Here, Lb is the distance between the first intersection point Pb and the outer circumferential surface 20a of the rotor 20, and Wb is the width of the bridge 41.

The width Wb of the bridge 41 may be formed as narrow as possible in order to maximize efficiency of the motor by minimizing magnetic flux leakage. Therefore, the width Wb of the bridge 41 may be determined to be as narrow as possible in consideration of the thickness of the material forming the rotor core and the manufacturing process of the rotor core.

For example, the width Wb of the bridge 41 may be formed to be greater than the thickness of the material and less than 0.4 mm in consideration of the thickness of the material forming the rotor core and the workability of the punching (pressing) process of the rotor core. In this case, Lb is 0.4 mm or more.

In other words, the width Wb of the bridge 41 may be formed to satisfy the following relationship.

$$Ct \leq Wb \leq 0.4 \text{ mm}$$

Here, Ct is the thickness of the rotor core sheet, and Wb is the width of the bridge 41.

Because an electrical steel sheet may be used as the rotor core, the rotor core sheet may have a thickness Ct of 0.25 mm to 0.35 mm.

As an example, when the thickness Ct of the rotor core sheet is 0.35 mm, the bridge width Wb may be 0.4 mm in consideration of the press process of the rotor core.

However, when the bridge width Wb is 0.4 mm, the thickness of the rotor core sheet is 0.35 mm. When the thickness of the rotor core sheet is 0.35 mm or more, the bridge width Wb may exceed 0.4 mm. For example, when the thickness of the rotor core sheet is 0.5 mm, the bridge width Wb may be 0.55 mm.

Meanwhile, when the width Wb of the bridge 41 is determined as described above, the upper limit of the slit length Sl may be determined as follows.

$$Sl \leq (Do-Di)/2-Wb*2$$

Here, Sl is the length of the slit 40, Do is the outer diameter of the rotor core, Di is the inner diameter of the rotor core, and Wb is the width of the bridge 41.

In addition, in order for the slit 40 to block magnetic flux leaking between two adjacent permanent magnets 30, the slit 40 may be formed to have a predetermined length or more.

For example, the second end 40b of the slit 40 adjacent to the inner circumferential surface 20b of the rotor 20 may be formed to be located at the same position as a second intersection point Ps where a virtual straight line PL2 connecting the upper corners P2 and P2 of the two adjacent permanent magnets 30 and the virtual straight line L1 dividing the slit 40 into two halves in the longitudinal direction intersect at a right angle, or closer to the center O of the rotor 20 than the second intersection point Ps. Here, the upper corner P2 of the permanent magnet 30 refers to the corner of the permanent magnet 30 farthest from the outer circumferential surface 20a of the rotor 20 among the two corners of the permanent magnet 30 farthest from the side surface of the slit 40.

Therefore, the lower limit of the slit length may be determined as follows.

$$Sl \geq Ds-Wb$$

Here, Sl is the length of the slit 40, Ds is the distance from the center O of the rotor to the second intersection point Ps, and Wb is the width of the bridge 41.

Therefore, the length of the slit 40 may be determined as follows.

$$Ds-Wb \leq Sl \leq (Do-Di)/2-Wb*2$$

When the bridge width Wb and the slit length Sl are determined as described above, the magnetic flux leaking between two adjacent permanent magnets 30 may be minimized, thereby increasing the efficiency of the motor.

The length Sl of the above-described slit 40 may be appropriately determined according to the size of the rotor core.

As an example, when the outer diameter Do of the rotor core is 61.8 mm, the inner diameter Di of the rotor core is 24.5 mm, and the bridge width Wb is 0.4 mm, the length Sl of the slit may be 17.85 mm.

In addition, the width Wr of the rib 42 between the one side surface of the slit 40 and one end of the magnet insertion hole 23 of the rotor 20 may be formed to satisfy the following relationship.

$$Ct \leq Wr \leq 0.4 \text{ mm}$$

Here, Ct is the thickness of the rotor core sheet (0.25 mm to 0.35 mm), and Wr is the width of the rib 42.

The width Wr of the rib may be equal to or wider than the width Wb of the bridge. As an example, when the bridge width Wb is 0.4 mm, the rib width Wr may be 0.4 mm.

When the width Wr of the rib 42 is determined as described above, the upper limit of the slit length may be determined as follows.

$$Sl \leq (Do-Di)/2-Wr*2$$

Here, Sl is the length of the slit 40, Do is the outer diameter of the rotor core, Di is the inner diameter of the rotor core, and Wr is the width of the rib 42.

When the width W of the slit 40 increases beyond a certain value in the limited area of the rotor 20, the length of the permanent magnet 30 decreases, so the amount of the magnet decreases. Accordingly, the amount of magnetic flux leaking from the magnetic poles to the void may decrease, and the back electromotive force may decrease due to the decrease in the total amount of magnetic flux in the void. Therefore, the width W of the slit 40 may be limited.

The rotor 20 may have a circular cross-section. Alternatively, the cross-section of the rotor 20 may have a shape deformed from circular. Hereinafter, the relationship between the width W of the slit 40 and the permanent magnet 30 will be described in detail with reference to FIG. 6.

Figure 6:
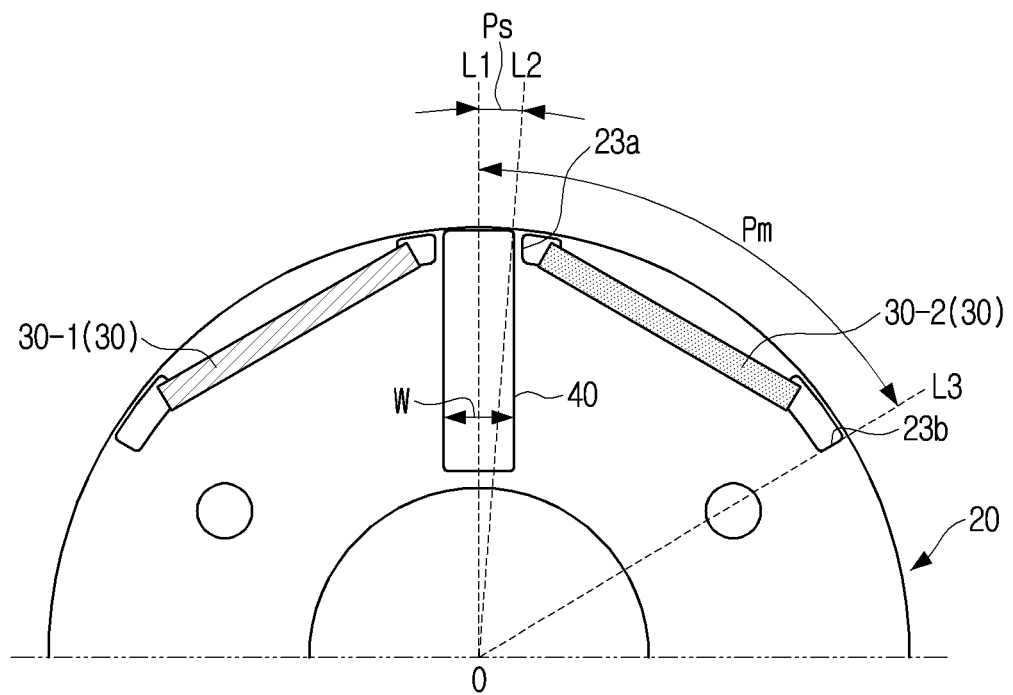
FIG. 6 is a view for explaining a relationship between a slit width and a magnet pole pitch of a rotor of a consequent pole type interior permanent magnet motor according to an embodiment of the disclosure.

FIG. 6 is a view for explaining a relationship between a slit width and a magnet pole pitch of a rotor of a consequent pole type interior permanent magnet motor according to an embodiment of the disclosure.

In FIG. 6, an angle between a first straight line L1 connecting the center O of the rotor 20 and the center of the width W of the slit 40 and a second straight line L2 connecting the center O of the rotor 20 and the corner of the first end 40a of the slit 40 is referred to as a slit pitch Ps, and an angle between the first straight line L1 and a third straight line L3 connecting the center O of the rotor 20 and the second end 23b of the magnet insertion hole 23 is referred to as a magnetic pole pitch Pm. Here, the first end 23a of the magnet insertion hole 23 refers to one end of the magnet insertion hole 23 that is located closest to the slit 40, and the second end 23b refers to the other end of the magnet insertion hole 23 that is located farthest from the slit 40.

Because the mechanical angle of the slit pitch Ps and the mechanical angle of the magnetic pole pitch Pm change when the number of poles of the motor is changed, the mechanical angles of the slit pitch Ps and the magnetic pole pitch Pm may be converted into electrical angles, respectively, so that they are not related to changes in the number of poles of the motor.

FIG. 7 is a table showing results obtained by simulating a change in back electromotive force according to a slit pitch of a rotor in a consequent pole type interior permanent magnet motor according to an embodiment of the disclosure by using a finite element method.

In FIG. 7, Ps_mech and Pm_mech represent the mechanical angles of the slit pitch Ps and the magnetic pole pitch Pm, respectively. Ps_elec is a conversion of the mechanical angle of the slit pitch Ps into an electrical angle, and Pm_elec is a conversion of the mechanical angle of the magnetic pole pitch Pm into an electrical angle.

Referring to FIG. 7, when there is no slit 40, that is, when the mechanical angle Ps_mech and the Ps_elec of the slit pitch Ps are zero degrees (0°), the back electromotive force is 46.45V. As the slit pitch Ps increases, the back electromotive force increases, and the back electromotive force becomes maximum when the electrical angle of the slit pitch Ps is 14.1°.

As the slit pitch Ps continues to increase, the length of the permanent magnet 30 decreases, so that the back electromotive force gradually decreases. When the electrical angle Ps_elec of the slit pitch Ps is 34.8°, the back electromotive force becomes the same as that of the case without the slit. When the electrical angle Ps_elec of the slit pitch Ps exceeds 34.8°, the back electromotive force is smaller than that of the case without the slit 40.

Figure 8:
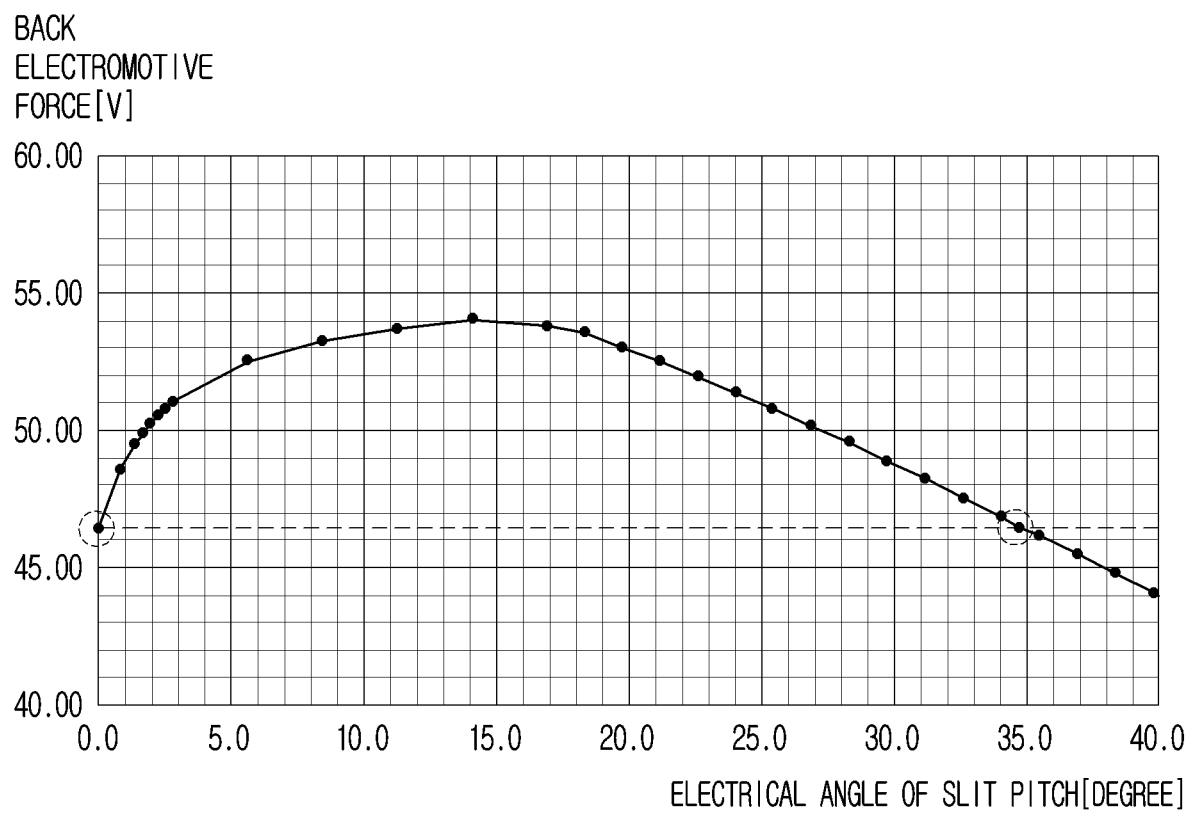
FIG. 8 is a graph illustrating a relationship between a slit pitch of a rotor and back electromotive force in a consequent pole type interior permanent magnet motor according to an embodiment of the disclosure.

The change in the back electromotive force depending on a change in the electrical angle Ps_elec of the slit pitch Ps is shown in FIG. 8.

FIG. 8 is a graph illustrating a relationship between a slit pitch of a rotor and back electromotive force in a consequent pole type interior permanent magnet motor according to an embodiment of the disclosure.

The range of the slit pitch Ps in which the back electromotive force is greater than the back electromotive force when the rotor 20 does not have the slit 40 can be seen from FIGS. 7 and 8. In other words, when the electrical angle Ps_elec of the slit pitch Ps satisfies the following condition, the back electromotive force of the rotor 20 with slits 40 is greater than the back electromotive force of the rotor 20 without slits.

$$0° < Ps\_elec < 34.8°$$

Therefore, the slit 40 of the rotor 20 may be formed to have a width W that can satisfy the range of the electrical angle Ps_elec of the slit pitch Ps as described above.

With the consequent pole type interior permanent magnet motor 1 according to an embodiment of the disclosure having the above structure, the amount of magnetization of the rotating shaft 50 may be reduced.

For example, as illustrated in FIGS. 2 and 3, when two permanent magnets 30-1 and 30-2 having different polarities are disposed adjacent to each other, that is, when the plurality of permanent magnets 30 are arranged around the shaft hole 21 of the rotor 20 in order of N-pole permanent magnet 30-1—S-pole permanent magnet 30-2—iron core 22—S-pole permanent magnet 30-2—N-pole permanent magnet 30-1—iron core 22, a flux path is formed between two adjacent permanent magnets 30-1 and 30-2 having different polarities, so that the magnetic flux density inside the rotor 20 is reduced. Therefore, the magnetic flux leaked to the rotating shaft 50 (see FIG. 9) may be reduced.

Figure 9:
FIG. 9 is a graph comparing the amount of magnetization of a rotating shaft of a consequent pole type interior permanent magnet motor according to an embodiment of the disclosure and the amount of magnetization of a rotating shaft of a consequent pole type interior permanent magnet motor according to the prior art.
Figure 9:
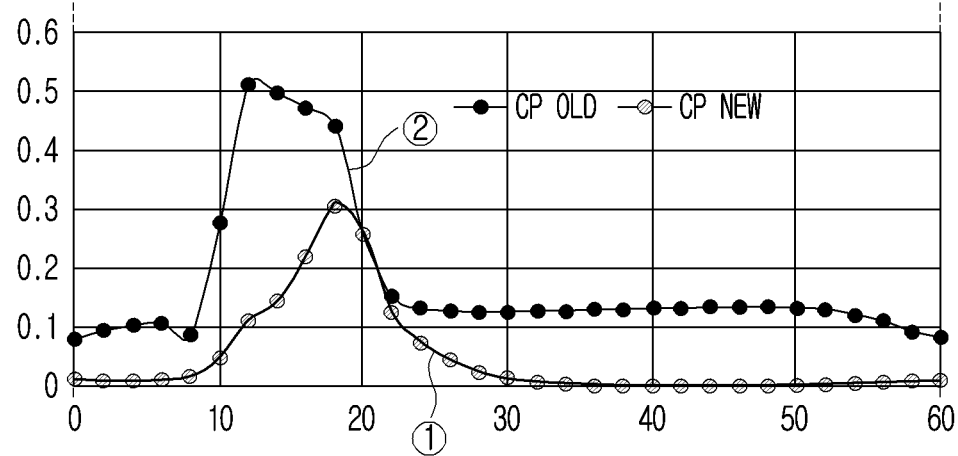

A result in which the magnetic flux leaked to the rotating shaft 50 of the consequent pole type interior permanent magnet motor 1 according to an embodiment of the disclosure is reduced compared to the consequent pole type interior permanent magnet motor according to the prior art is shown in FIG. 9.

FIG. 9 is a graph comparing the amount of magnetization of a rotating shaft of a consequent pole type interior permanent magnet motor according to an embodiment of the disclosure and the amount of magnetization of a rotating shaft of a consequent pole type interior permanent magnet motor according to the prior art.

FIG. 9 shows a result of comparing magnetization amounts (surface Gauss) of both ends A and B of the rotating shaft 50 using a finite element method (FEM).

In FIG. 9, the horizontal axis represents the length of the rotating shaft 50, the vertical axis represents the surface Gauss, and its unit is Tesla T. Curve ① represents the amount of magnetization of the rotating shaft 50 of the consequent pole type interior permanent magnet motor 1 according to an embodiment of the disclosure, and curve ② represents the amount of magnetization of the rotating shaft of the consequent pole type interior permanent magnet motor according to the prior art.

Referring to FIG. 9, it can be seen that the magnetization amount of the rotating shaft 50 of the consequent pole type interior permanent magnet motor 1 according to an embodiment of the disclosure is lower than the magnetization amount of the rotating shaft of the consequent pole type interior permanent magnet motor according to the prior art.

Table 1 below is a table showing the rate at which the surface Gauss at points A and B of the rotating shaft 50 of the consequent pole type interior permanent magnet motor 1 according to an embodiment of the disclosure is reduced compared to the surface Gauss of the rotating shaft of the consequent pole type interior permanent magnet motor according to the prior art.

TABLE 1

| classification | | prior art | the disclosure | decrease rate(%) |
|---|---|---|---|---|
| surface Gauss [Tesla] | Point A | 0.062 | 0.009 | 85.3 |
| | Point B | 0.058 | 0.011 | 81.3 |

Referring to FIG. 9 and Table 1, it can be seen that the surface Gauss at both ends of the rotating shaft 50 of the consequent pole type interior permanent magnet motor 1 according to an embodiment of the disclosure, that is, at points A and B is reduced by 85.3% and 81.3% compared to the surface Gauss at both ends of the rotating shaft of the consequent pole type interior permanent magnet motor according to the prior art, that is, at points A and B. Therefore, in the consequent pole type interior permanent magnet motor 1 according to an embodiment of the disclosure, the magnetization amount of the rotating shaft 50 may be lower than that of the rotating shaft of the consequent pole type interior permanent magnet motor according to the prior art.

In addition, in the consequent pole type interior permanent magnet motor 1 according to an embodiment of the disclosure having the structure shown in FIGS. 2 and 3, the second harmonic component of the back electromotive force may be greatly reduced compared to the consequent pole type interior permanent magnet motor according to the prior art. The results are shown in FIG. 10.

Figure 10:
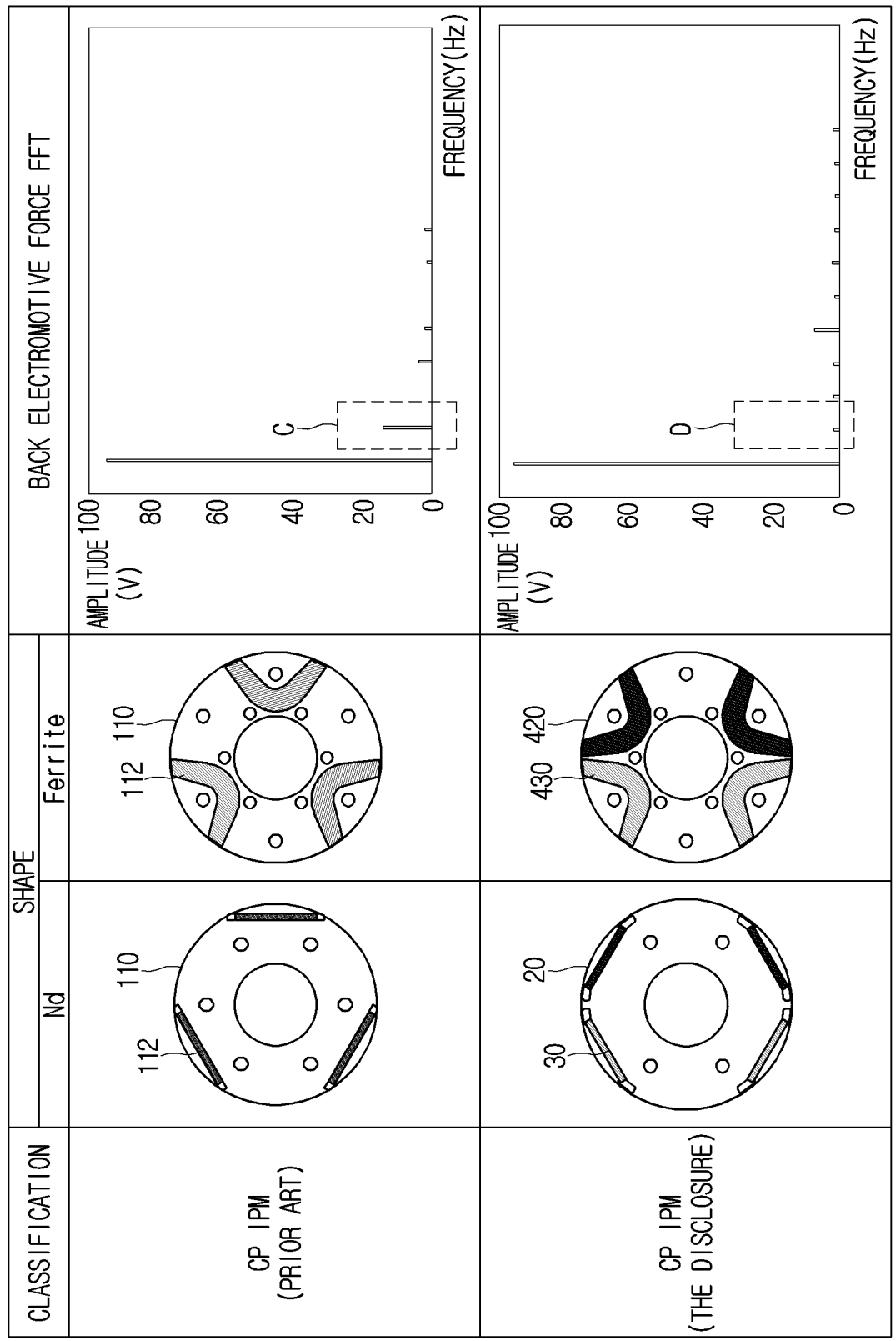
FIG. 10 is a view illustrating a second harmonic component of back electromotive force of a consequent pole type interior permanent magnet motor according to an embodiment of the disclosure and a second harmonic component of back electromotive force of a consequent pole type interior permanent magnet motor according to the prior art.

FIG. 10 is a view illustrating a second harmonic component of back electromotive force of a consequent pole type interior permanent magnet motor according to an embodiment of the disclosure and a second harmonic component of back electromotive force of a consequent pole type interior permanent magnet motor according to the prior art.

In FIG. 10, the back electromotive force FFT refers to a frequency analysis of the back electromotive force using Fast Fourier Transform (FFT). The horizontal axis represents frequency and its unit is Hz, and the vertical axis represents amplitude and its unit is voltage (V).

Referring to FIG. 10, in the case of the consequent pole type interior permanent magnet motor according to the prior art having a rotor 110 in which a plurality of permanent magnets 112 having the same polarity are arranged at regular intervals, the second harmonic component of the back electromotive force is present at about 15V (region C).

However, in the case of the consequent pole type interior permanent magnet motor 1 according to an embodiment of the disclosure, there is almost no second harmonic component of the back electromotive force (region D). In other words, when two permanent magnets 30 having different polarities are disposed adjacent to each other, as in one embodiment of the disclosure, the second harmonic component of the back electromotive force may be greatly reduced.

In addition, as in the consequent pole type interior permanent magnet motor 1 according to an embodiment of the disclosure shown in FIGS. 2 and 3, when the magnetic resistance of the iron core portion between the two adjacent permanent magnets 30-1 and 30-2 is increased by providing the slit 40 inside the rotor 20, that is, between the two adjacent permanent magnets 30-1 and 30-2, some of the magnetic flux generated inside the rotor 20 by the permanent magnets 30 is induced more in the direction of the consequent pole with low magnetic resistance, so that the amount of magnetic flux leaking from the iron core portion where the consequent pole 22 is formed to the void may be increased. As a result, a magnetic unbalance between the amount of magnetic flux leaked to the stator 10 by the permanent magnet 30 and the amount of magnetic flux leaked to the stator 10 by the consequent pole 22 may be reduced.

In addition, in the consequent pole type interior permanent magnet motor 1 according to an embodiment of the disclosure, because the amount of magnetic flux leaking from the consequent pole 22 to the stator 10 through the void increases, the total amount of magnetic flux in the void may increase. As a result, the back electromotive force may increase. Here, the total amount of magnetic flux in the void refers to the sum of the amount of magnetic flux leaking from the permanent magnet 30 to the stator 10 through the void and the amount of magnetic flux leaking from the consequent pole 22 to the stator 10 through the void.

Figure 11:
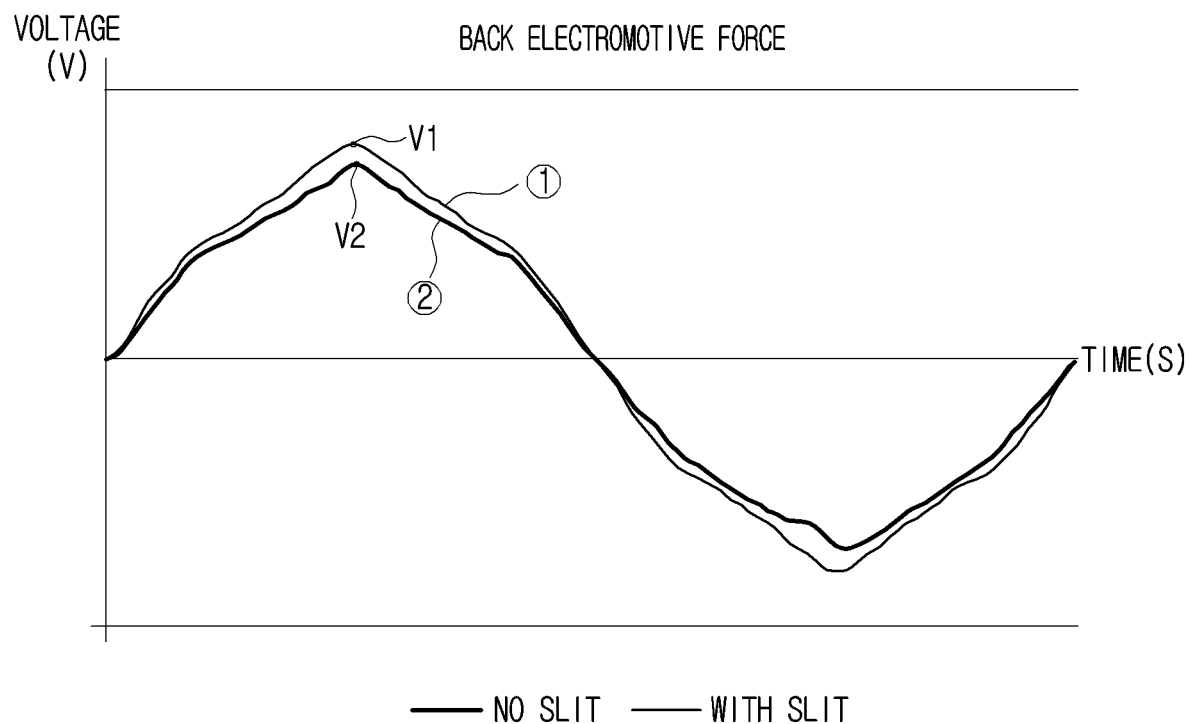
FIG. 11 is a graph comparing back electromotive force of a consequent pole type interior permanent magnet motor according to an embodiment of the disclosure with back electromotive of a consequent pole type interior permanent magnet motor according to an embodiment of the disclosure in which slits are removed from a rotor.

FIG. 11 is a graph comparing back electromotive force of a consequent pole type interior permanent magnet motor according to an embodiment of the disclosure with back electromotive force of a consequent pole type interior permanent magnet motor according to an embodiment of the disclosure in which slits are removed from a rotor.

In FIG. 11, the horizontal axis represents time (s), and the vertical axis represents voltage (V). In addition, curve ① represents the back electromotive force of the consequent pole type interior permanent magnet motor 1 according to an embodiment of the disclosure, and curve ② represents the back electromotive force of the consequent pole type interior permanent magnet motor according to an embodiment of the disclosure without the slits.

Referring to FIG. 11, the maximum back electromotive force of the consequent pole type interior permanent magnet motor 1 according to an embodiment of the disclosure having the slit 40 is greater than the maximum back electromotive force of the consequent pole type interior permanent magnet motor 1 according to an embodiment of the disclosure without the slit 40. For example, in FIG. 11, the back electromotive force of V1 indicating the maximum back electromotive force when the slit 40 is present is 54.01V, and the back electromotive force of V2 indicating the maximum back electromotive force when the slit 40 is not present is 48.39V.

In the above description, the permanent magnets 30 of the rotor 20 have an I-shape. However, the shape of the permanent magnets 30 is not limited thereto. Hereinafter, a consequent pole type interior permanent magnet motor using permanent magnets having different shapes according to an embodiment of the disclosure will be described with reference to FIGS. 12 and 13.

Figure 12:
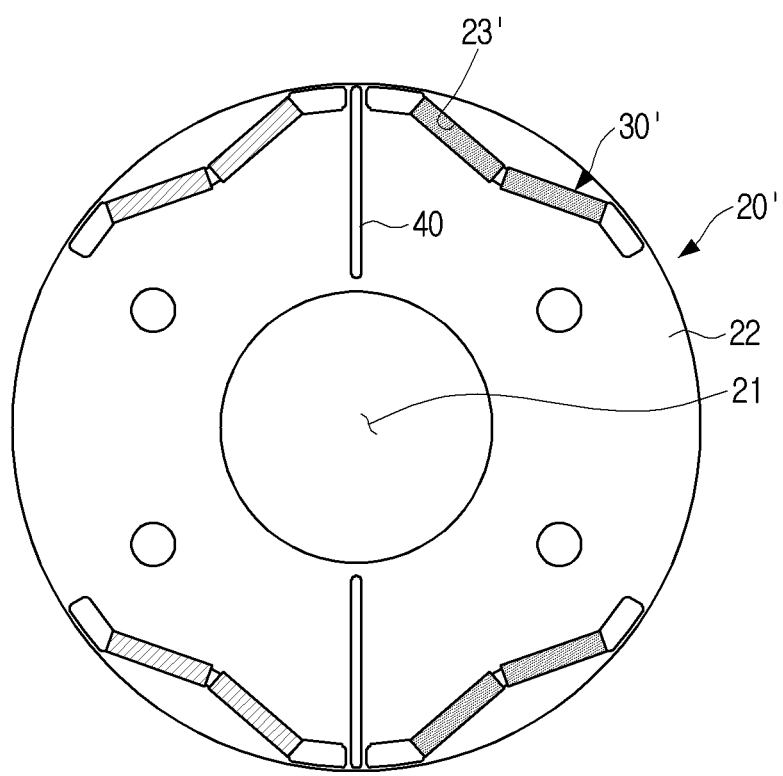
FIG. 12 is a cross-sectional view illustrating a consequent pole type interior permanent magnet motor according to another embodiment of the disclosure in which permanent magnets have a V-shape.

FIG. 12 is a cross-sectional view illustrating a consequent pole type interior permanent magnet motor according to another embodiment of the disclosure in which permanent magnets are V-shaped.

Referring to FIG. 12, the rotor 20' of the consequent pole type interior permanent magnet motor 1 according to an embodiment of the disclosure may include a plurality of permanent magnets 30', slits 40, and a shaft hole 21.

The plurality of permanent magnets 30' are disposed between the outer circumferential surface of the rotor 20' and the shaft hole 21, and two adjacent permanent magnets 30' may be arranged symmetrically with respect to the slit 40 inside the rotor 20'.

Each of the plurality of permanent magnets 30' may be formed in a V shape as illustrated in FIG. 12. For example, two bar-shaped permanent magnets 30' may be arranged in a V shape. The bar-shaped permanent magnets 30' disposed in a V shape may have a width smaller than that of the I-shaped permanent magnets 30 of the motor 1 according to the above-described embodiment. The two bar-shaped permanent magnets 30' arranged in a V shape have the same polarity.

The plurality of permanent magnets 30' may be formed of a rare earth element. For example, the plurality of permanent magnets 30' may be formed neodymium Nd.

The rotor 20' is formed of an iron core, and a plurality of magnet insertion holes 23' in which the permanent magnets 30' are disposed may be formed in the iron core of the rotor 20' in the circumferential direction of the rotor 20'. Each of the plurality of magnet insertion holes 23' may be formed in a V shape to correspond to the shape of the permanent magnets 30'.

In the plurality of permanent magnets 30' disposed in the rotor 20', two adjacent permanent magnets 30' with a slit 40 interposed therebetween have different polarities. When the plurality of permanent magnets 30' including two permanent magnets 30' having different polarities as one set are disposed in the rotor 20', the iron core portions of the rotor 20' between the two sets is magnetized to form a plurality of consequent poles (iron core poles) 22 in the rotor 20'. In other words, the iron core portion between two permanent magnets 30' that are spaced far apart from each other and have the same polarity is magnetized to form the consequent pole 22.

The distance between the two permanent magnets 30' having different polarities with the slit 40 interposed therebetween is shorter than the distance between the two permanent magnets 30' having the same polarity.

The slits 40 and the shaft hole 21 of the rotor 20' according to this embodiment are the same as or similar to the slits 40 and the shaft hole 21 of the rotor 20 of the consequent pole type interior permanent magnet motor 1 according to the above-described embodiment; therefore, detailed descriptions thereof are omitted.

Figure 13:
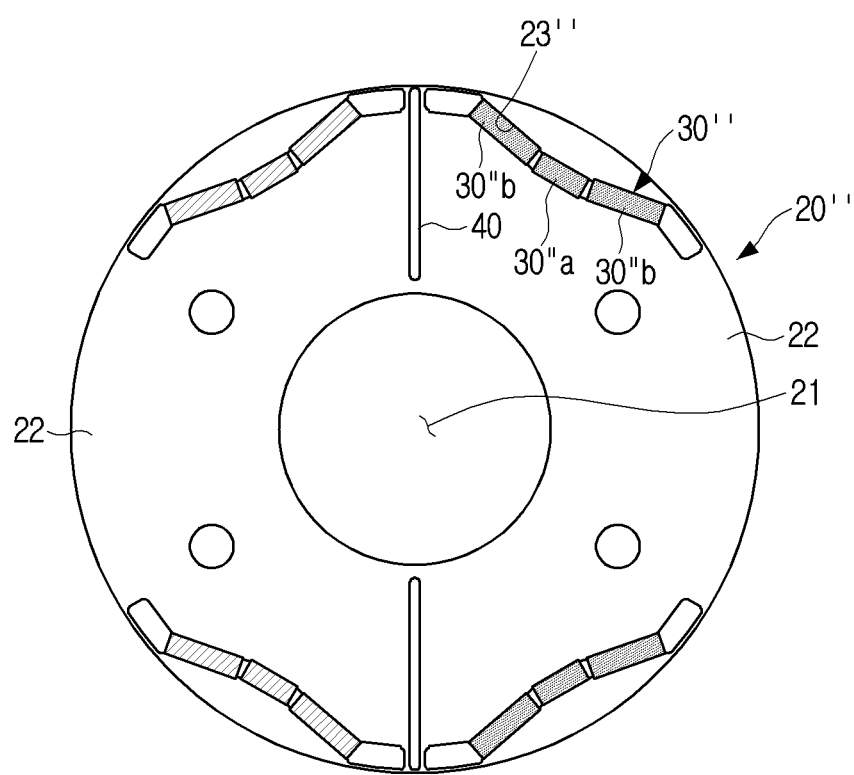
FIG. 13 is a cross-sectional view illustrating a consequent pole type interior permanent magnet motor according to another embodiment of the disclosure in which permanent magnets have U-shape.

FIG. 13 is a cross-sectional view illustrating a consequent pole type interior permanent magnet motor according to another embodiment of the disclosure in which permanent magnets are U-shaped.

Referring to FIG. 13, the rotor 20" of the consequent pole type interior permanent magnet motor 1 according to an embodiment of the disclosure may include a plurality of permanent magnets 30", slits 40, and a shaft hole 21.

The plurality of permanent magnets 30" are disposed between the outer circumferential surface of the rotor 20" and the shaft hole 21, and two adjacent permanent magnets 30" may be arranged symmetrically with respect to the slit 40 inside the rotor 20".

Each of the plurality of permanent magnets 30" may be formed in a U shape as illustrated in FIG. 13. For example, three bar-type permanent magnets 30" may be arranged in a U shape. That is, two bar-shaped permanent magnets 30"b may be inclinedly disposed on the left and right sides of the central permanent magnet 30"a. The bar-shaped permanent magnets 30" disposed in a U shape may have a width narrower than the width of the I-shaped permanent magnets, 30 of the consequent pole type interior permanent magnet motor 1 according to the above-described embodiment. The three bar-shaped permanent magnets 30" arranged in a U shape have the same polarity.

The plurality of permanent magnets 30" may be formed of a rare earth element. For example, the plurality of permanent magnets 30" may be formed of neodymium Nd.

The rotor 20" is formed of an iron core, and a plurality of magnet insertion holes 23" in which the permanent magnets 30" are disposed may be formed in the iron core of the rotor 20" in the circumferential direction of the rotor 20". Each of the plurality of magnet insertion holes 23" may be formed in a substantially U shape to correspond to the shape of the permanent magnets 30".

In the plurality of permanent magnets 30" disposed in the rotor 20", two adjacent permanent magnets 30" with the slit 40 interposed therebetween have different polarities. When the plurality of permanent magnets 30" including two permanent magnets 30" having different polarities as one set are disposed in the rotor 20", the iron core portions of the rotor 20" between the two sets are magnetized to form a plurality of consequent poles (iron core poles) 22 in the rotor 20". In other words, the iron core portion between two permanent magnets 30" that are spaced far apart from each other and have the same polarity is magnetized to form the consequent pole 22.

The distance between the two permanent magnets 30" having different polarities with the slit 40 interposed therebetween is shorter than the distance between the two permanent magnets 30" having the same polarity.

The slits 40 and the shaft hole 21 of the rotor 20" according to this embodiment are the same as or similar to them of the rotor 20 of the consequent pole type interior permanent magnet motor 1 according to the above-described embodiment; therefore, detailed descriptions thereof are omitted.

In the above description, the consequent pole type interior permanent magnet motor 1 has six magnetic poles, that is, four permanent magnets 30 and two consequent poles 22. However, the number of magnetic poles of the consequent pole type interior permanent magnet motor 1 according to an embodiment of the disclosure is not limited thereto. Hereinafter, a consequent pole type interior permanent magnet motor having a different number of magnetic poles will be described with reference to FIGS. 14 and 15.

Figure 14:
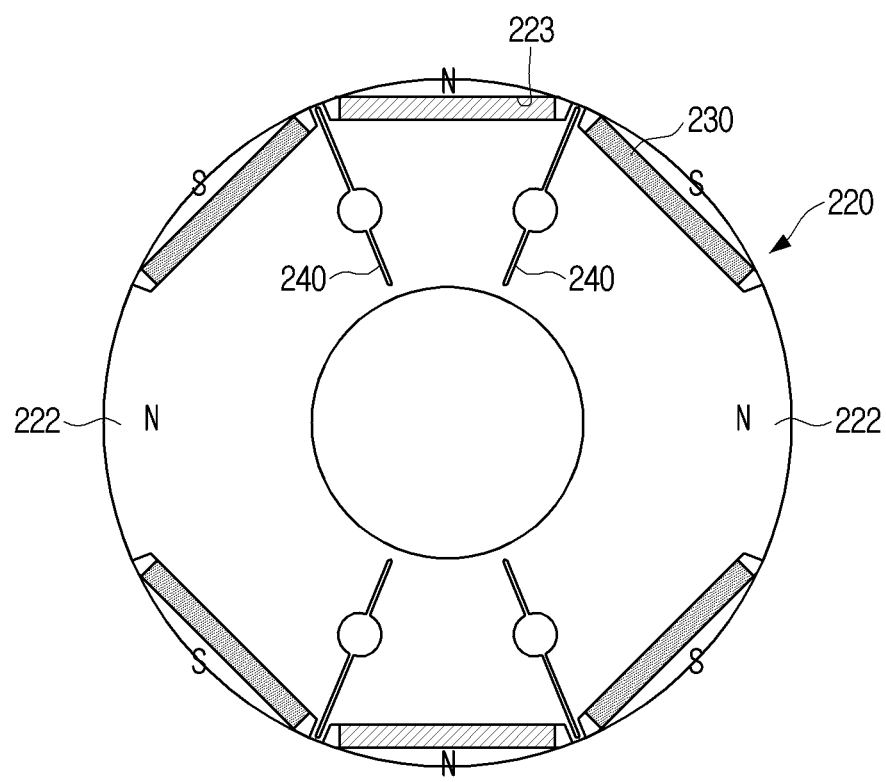
FIG. 14 is a cross-sectional view illustrating a consequent pole type interior permanent magnet motor according to an embodiment of the disclosure having eight magnetic poles.

FIG. 14 is a cross-sectional view illustrating a consequent pole type interior permanent magnet motor according to an embodiment of the disclosure having eight magnetic poles.

Referring to FIG. 14, the rotor 220 of the consequent pole type interior permanent magnet motor according to an embodiment of the disclosure may include six permanent magnets 230, two consequent poles 222, and four slits 240.

Therefore, the consequent pole type interior permanent magnet motor according to an embodiment of the disclosure includes a total of eight magnetic poles including two consequent poles 222 and six magnetic poles formed of six permanent magnets 230.

Three adjacent permanent magnets 230 may form one permanent magnet set, and two permanent magnet sets may be symmetrically disposed with respect to two consequent poles 222.

The three permanent magnets 230 constituting the permanent magnet set may be disposed adjacent to each other with two slits 240 interposed therebetween in the rotor 220. For example, as illustrated in FIG. 14, the permanent magnet set may be arranged in the order of the S-pole permanent magnet 230, the slit 240, the N-pole permanent magnet 230, the slit 240, and the S-pole permanent magnet 230.

Accordingly, the two adjacent permanent magnets 230 with the slit 240 interposed therebetween have different polarities. In addition, the two adjacent permanent magnets 230 are arranged to be symmetrical to each other with respect to the slit 240. Accordingly, one permanent magnet 230 may be positioned between the two slits 240.

The distance between the two permanent magnets 230 having the same polarity is greater than the distance between the two permanent magnets 230 having different polarities. A consequent pole 222 is formed by the two permanent magnets 230 having the same polarity in the iron core portion of the rotor between the two permanent magnets 230 having the same polarity. In addition, the slit 240 is not formed in the iron core portion between the two permanent magnets 230 having the same polarity.

In the case of the embodiment shown in FIG. 14, because the two permanent magnets 230 having the same polarity far apart have an S pole, a consequent pole 222 having an N pole is formed in the iron core portion between the two permanent magnets 230 having the same polarity.

Each of the plurality of slits 240 may be formed adjacent to the outer circumferential surface of the rotor 220 across the width of two adjacent magnet insertion holes 223 into which the permanent magnets 230 are inserted. The shape of the slit 240 is the same as or similar to that of the slit 40 of the consequent pole type interior permanent magnet motor 1 according to the above-described embodiment; therefore, a detailed description thereof is omitted.

Figure 15:
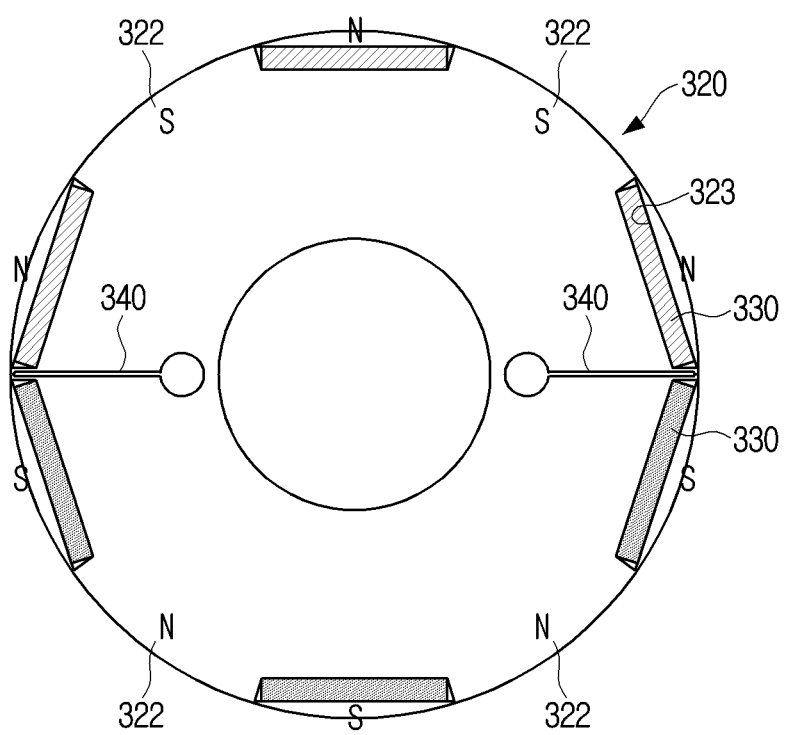
FIG. 15 is a cross-sectional view illustrating a consequent pole type interior permanent magnet motor according to an embodiment of the disclosure having ten magnetic poles.

FIG. 15 is a cross-sectional view illustrating a consequent pole type interior permanent magnet motor according to an embodiment of the disclosure having ten magnetic poles.

Referring to FIG. 15, the rotor 320 of the consequent pole type interior permanent magnet motor according to an embodiment of the disclosure may include six permanent magnets 330, four consequent poles 322, and two slits 340.

Therefore, the consequent pole type interior permanent magnet motor according to an embodiment of the disclosure includes a total of ten magnetic poles including four consequent poles 322 and six magnetic poles formed of six permanent magnets 330.

The two slits 340 may be provided in the rotor 320 at intervals of 180 degrees. In other words, the two slits 340 may be provided to form a straight line in the rotor 320.

In the embodiment show in FIG. 15, as for the six permanent magnets 330, three permanent magnets 330 are disposed on each of the upper and lower portions of the rotor 320 based on the two slits 340.

The three permanent magnets 330 disposed on the upper portion have the same polarity and are spaced apart at regular intervals. The three permanent magnets 330 disposed on the lower portion have the same polarity and are spaced apart at regular intervals. Polarities of the three permanent magnets 330 disposed on the upper portion are different from those of the three permanent magnets 330 disposed on the lower portion. Accordingly, the two adjacent permanent magnets 330 with the slit 340 interposed therebetween have different polarities. In addition, the two adjacent permanent magnets 330 are arranged to be symmetrical to each other with respect to the slit 340.

The distance between the two permanent magnets 330 having the same polarity is greater than the distance between the two permanent magnets 330 having different polarities. A consequent pole 322 is formed by the two permanent magnets 330 having the same polarity in the iron core portion of the rotor between the two permanent magnets 330 having the same polarity. In addition, the slit 340 is not formed in the iron core portion between the two permanent magnets 330 having the same polarity.

For example, as illustrated in FIG. 15, three N-pole permanent magnets 330 may be disposed at regular intervals on the upper portion of the rotor 320. An S-pole consequent pole 322 may be formed by the two N-pole permanent magnets 330 in the iron core portion between the two N-pole permanent magnets 330. Accordingly, two consequent poles 322 having the S pole may be formed at the upper portion of the rotor 320.

In addition, three S-pole permanent magnets 330 may be disposed at regular intervals on the lower portion of the rotor 320. An N-pole consequent pole 322 may be formed by the two S-pole permanent magnets 330 in the iron core portion between the two S-pole permanent magnets 330. Accordingly, two consequent poles 322 having the N pole may be formed at the lower portion of the rotor 320.

Each of the plurality of slits 340 may be formed adjacent to the outer circumferential surface of the rotor 320 across the width of two adjacent magnet insertion holes 323 into which the permanent magnets 330 are inserted. The shape of the slit 340 is the same as or similar to that of the slit 40 of the consequent pole type interior permanent magnet motor 1 according to the above-described embodiment; therefore, a detailed description thereof is omitted.

In the above description, the consequent pole type interior permanent magnet motor 1 uses permanent magnets 30, 30', and 30" formed of rare earth element, for example, neodymium Nd. However, the disclosure is not limited thereto. The consequent pole type interior permanent magnet motor according to an embodiment of the disclosure may use permanent magnets formed of ferrite.

Hereinafter, a consequent pole type interior permanent magnet motor using ferrite magnets according to an embodiment of the disclosure will be described with reference to FIGS. 16 to 18.

Figure 16:
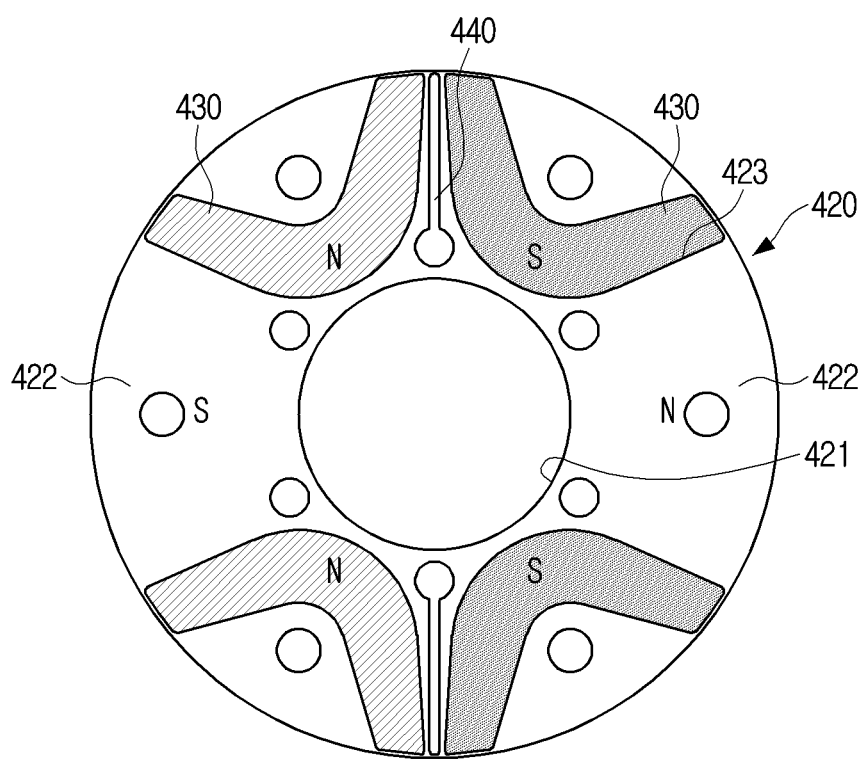
FIG. 16 is a cross-sectional view illustrating a consequent pole type interior permanent magnet motor according to an embodiment of the disclosure using ferrite magnets and having six magnetic poles.

FIG. 16 is a cross-sectional view illustrating a consequent pole type interior permanent magnet motor according to an embodiment of the disclosure using ferrite magnets and having six magnetic poles.

Referring to FIG. 16, a plurality of permanent magnets 430 are disposed inside the rotor 420 of the consequent pole type interior permanent magnet motor according to an embodiment of the disclosure. In detail, the plurality of permanent magnets 430 are disposed between the outer circumferential surface of the rotor 420 and the shaft hole 421.

Because the motor according to this embodiment is a six poles consequent pole type interior permanent magnet motor, in the rotor 420, four permanent magnets 430 are disposed and two consequent poles 422 are formed.

The permanent magnets 430 may be formed in a C-shape, which is a magnetic flux concentration type. Also, the permanent magnets 430 may be formed of ferrite.

The rotor 420 is formed of an iron core, and four magnet insertion holes 423 in which the permanent magnets 430 are disposed may be formed in the circumferential direction of the rotor 420. The four magnet insertion holes 423 may be formed in a C-shape to correspond to the shape of the permanent magnet 430.

As for four permanent magnets 430 disposed in the rotor 420, two adjacent permanent magnets 430 with the slit 440 interposed therebetween have different polarities. When the four permanent magnets 430 including two permanent magnets 430 having different polarities as one set are disposed in the rotor 420, the iron core portions of the rotor 420 between the two permanent magnet sets are magnetized to form a plurality of consequent poles (iron core poles) 422 in the rotor 420. In other words, the iron core portion between two permanent magnets 430 that are spaced far apart from each other and have the same polarity is magnetized to form the consequent pole 422.

For example, when the plurality of permanent magnets 430 are arranged in the order of N-pole permanent magnet, S-pole permanent magnet, iron core, S-pole permanent magnet, N-pole permanent magnet, and iron core in the rotor 420, portions of the rotor 420, that is, portions of the iron core between the two permanent magnets 430 having the same polarity are magnetized with a polarity opposite to that of the two permanent magnets 430.

The distance between the two permanent magnets 430 having different polarities with the slit 440 interposed therebetween is shorter than the distance between the two permanent magnets 430 having the same polarity.

The slits 440 and the shaft hole 421 of the rotor 420 according to this embodiment are the same as or similar to those of the rotor 20 of the consequent pole type interior permanent magnet motor 1 according to the above-described embodiment; therefore, detailed descriptions thereof are omitted.

Figure 17:
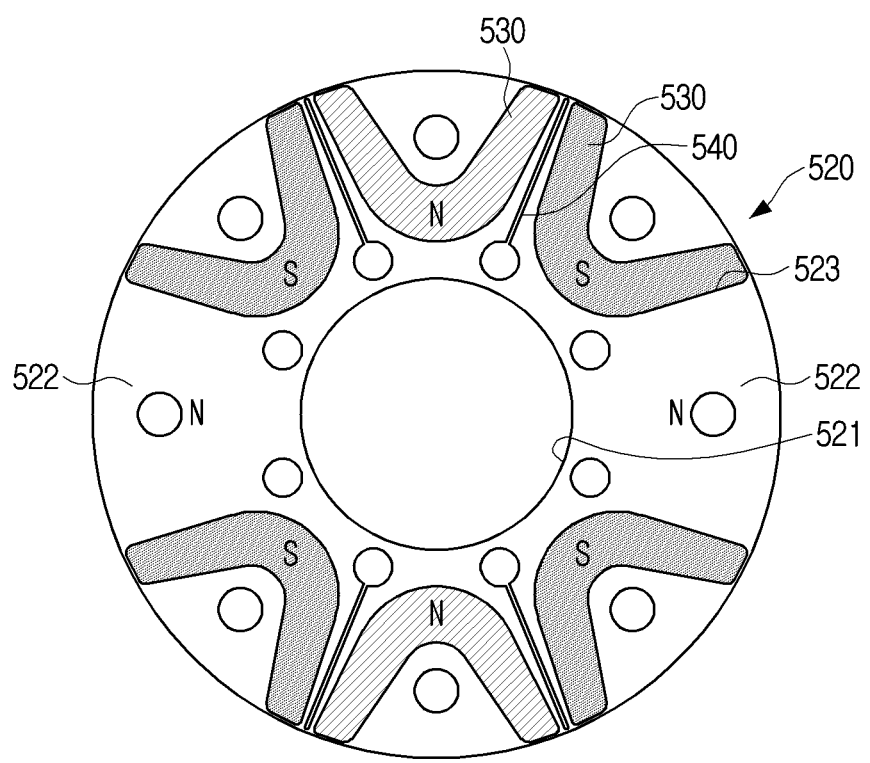
FIG. 17 is a cross-sectional view illustrating a consequent pole type interior permanent magnet motor according to an embodiment of the disclosure using ferrite magnets and having eight magnetic poles.

FIG. 17 is a cross-sectional view illustrating a consequent pole type interior permanent magnet motor according to an embodiment of the disclosure using ferrite magnets and having eight magnetic poles.

Referring to FIG. 17, a plurality of permanent magnets 530 are disposed inside the rotor 520 of the consequent pole type interior permanent magnet motor according to an embodiment of the disclosure. In detail, the plurality of permanent magnets 530 are disposed between the outer circumferential surface of the rotor 520 and the shaft hole 521.

Because the motor according to this embodiment is an eight poles consequent pole type interior permanent magnet motor, in the rotor 520, six permanent magnets 530 are disposed and two consequent poles 522 are formed.

The permanent magnets 530 may be formed in a C-shape, which is a magnetic flux concentration type. Also, the permanent magnets 530 may be formed of ferrite.

The rotor 520 is formed of an iron core, and six magnet insertion holes 523 in which the permanent magnets 530 are disposed may be formed in the circumferential direction of the rotor 520. The six magnet insertion holes 523 may be formed in a C-shape to correspond to the shape of the permanent magnet 530.

Three adjacent permanent magnets 530 may form one permanent magnet set, and two permanent magnet sets may be symmetrically disposed with respect to two consequent poles 522.

The three permanent magnets 530 constituting the permanent magnet set may be arranged in the order of an S-pole permanent magnet 530, a slit 540, an N-pole permanent magnet 530, a slit 540, and an S-pole permanent magnet 530 with two slits 540 interposed therebetween.

Accordingly, the two adjacent permanent magnets 530 with the slit 540 interposed therebetween have different polarities. In addition, the two adjacent permanent magnets 530 are arranged to be symmetrical to each other with respect to the slit 540. Accordingly, one permanent magnet 530 may be positioned between the two slits 540.

The distance between the two permanent magnets 530 having the same polarity is greater than the distance between the two permanent magnets 530 having different polarities. A consequent pole 522 is formed by the two permanent magnets 530 having the same polarity in the iron core portion of the rotor between the two permanent magnets 530 having the same polarity. In addition, the slit 540 is not formed in the iron core portion between the two permanent magnets 530 having the same polarity.

In the case of the embodiment shown in FIG. 17, because the two permanent magnets 530 having the same polarity far apart have S poles, a consequent pole 522 having an N pole is formed in the iron core portion between the two permanent magnets 530 having the same polarity.

The slits 540 and the shaft hole 521 of the rotor 520 according to this embodiment are the same as or similar to those of the rotor 20 of the consequent pole type interior permanent magnet motor 1 according to the above-described embodiment; therefore, detailed descriptions thereof are omitted.

Figure 18:
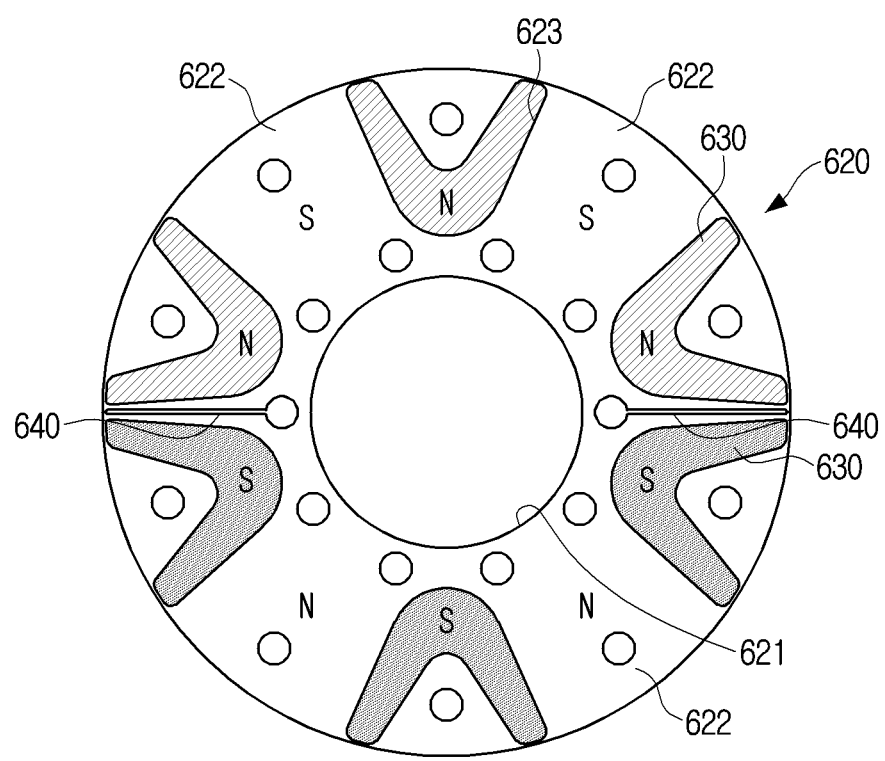
FIG. 18 is a cross-sectional view illustrating a consequent pole type interior permanent magnet motor according to an embodiment of the disclosure using ferrite magnets and having ten magnetic poles.

FIG. 18 is a cross-sectional view illustrating a consequent pole type interior permanent magnet motor according to an embodiment of the disclosure using ferrite magnets and having ten magnetic poles.

Referring to FIG. 18, a plurality of permanent magnets 630 are disposed inside the rotor 620 of the consequent pole type interior permanent magnet motor according to an embodiment of the disclosure. In detail, the plurality of permanent magnets 630 are disposed between the outer circumferential surface of the rotor 620 and the shaft hole 621.

Because the motor according to this embodiment is a ten poles consequent pole type interior permanent magnet motor, in the rotor 620, six permanent magnets 630 are disposed and four consequent poles 622 are formed.

The permanent magnets 630 may be formed in a C-shape, which is a magnetic flux concentration type. Also, the permanent magnets 630 may be formed of ferrite.

The rotor 620 is formed of an iron core, and six magnet insertion holes 623 in which the permanent magnets 630 are disposed may be formed in the circumferential direction of the rotor 620. The six magnet insertion holes 623 may be formed in a C-shape to correspond to the shape of the permanent magnet 630.

The two slits 640 may be provided in the rotor 620 at intervals of 180 degrees. In other words, the two slits 640 may be provided to form a straight line in the rotor 620.

In the embodiment show in FIG. 18, as for the six permanent magnets 630, three permanent magnets 630 are disposed on each of the upper and lower portions of the rotor 620 based on the two slits 640.

The three permanent magnets 630 disposed on the upper portion have the same polarity and are spaced apart at regular intervals. The three permanent magnets 630 disposed on the lower portion also have the same polarity and are spaced apart at regular intervals. Polarities of the three permanent magnets 630 disposed on the upper portion are different from those of the three permanent magnets 630 disposed on the lower portion. Accordingly, the two adjacent permanent magnets 630 with the slit 640 interposed therebetween have different polarities. In addition, the two adjacent permanent magnets 630 are arranged to be symmetrical to each other with respect to the slit 640.

The distance between the two permanent magnets 630 having the same polarity is greater than the distance between the two permanent magnets 630 having different polarities. A consequent pole 622 is formed by the two permanent magnets 630 having the same polarity in the iron core portion of the rotor between the two permanent magnets 630 having the same polarity. In addition, the slit 640 is not formed in the iron core portion between the two permanent magnets 630 having the same polarity.

For example, as illustrated in FIG. 18, three N-pole permanent magnets 630 may be disposed at regular intervals on the upper portion of the rotor 620. An S-pole consequent pole 622 may be formed by the two N-pole permanent magnets 630 in the iron core portion between the two N-pole permanent magnets 630. Accordingly, two consequent poles 622 having the S pole may be formed at the upper portion of the rotor 620.

In addition, three S-pole permanent magnets 630 may be disposed at regular intervals on the lower portion of the rotor 620. An N-pole consequent pole 622 may be formed by the two S-pole permanent magnets 630 in the iron core portion between the two S-pole permanent magnets 630. Accordingly, two consequent poles 622 having the N pole may be formed at the lower portion of the rotor 620.

The slits 640 and the shaft hole 621 of the rotor 620 according to this embodiment are the same as or similar to those of the rotor 20 of the consequent pole type interior permanent magnet motor 1 according to the above-described embodiment; therefore, detailed descriptions thereof are omitted.

With the consequent pole type interior permanent magnet motor according to an embodiment of the disclosure having the above-described structure, the amount of magnetization of the rotating shaft and the second harmonic component of the back electromotive force may be reduced.

In addition, with the consequent pole type interior permanent magnet motor according to an embodiment of the disclosure, the unbalance between the amount of magnetic flux leaked to the stator by the permanent magnet and the amount of magnetic flux leaked to the stator by the consequent pole may be eliminated and the back electromotive force may be increased.

The disclosure has been described above in an exemplary manner. The terms used herein are for the purpose of description and should not be construed in a limiting sense.

Various modifications and variations of the disclosure are possible according to the above contents. Accordingly, unless otherwise stated, the disclosure may be practiced freely within the scope of the claims.

What is claimed is:

1. A consequent pole type interior permanent magnet motor comprising:
   a stator;
   a rotor rotatable inside the stator;
   a plurality of permanent magnets inside the rotor; and
   a plurality of slits formed along a radial direction of the rotor so that each slit of the plurality of slits is:
      between a respective two adjacent permanent magnets of the plurality of permanent magnets, and
      configured to increase a magnetic resistance between the respective two adjacent permanent magnets,
   wherein consequent poles are formed between two adjacent permanent magnets, of the plurality of permanent magnets, that have a same polarity,
   a magnetic flux generated inside the rotor by a permanent magnet of the respective two adjacent permanent magnets is directed more toward a consequent pole of the consequent poles than toward a slit between the two adjacent permanent magnets due to the increased magnetic resistance caused by the slit between the respective two adjacent permanent magnets, and
   a number of the consequent poles formed in the rotor is less than a number of the plurality of permanent magnets.

2. The consequent pole type interior permanent magnet motor of claim 1, wherein each of the plurality of slits is centered between the respective two adjacent permanent magnets of the plurality of permanent magnets.

3. The consequent pole type interior permanent magnet motor of claim 2, wherein each of the plurality of slits is formed so that an end thereof adjacent to an outer circumferential surface of the rotor passes through a region of the rotor between the respective two adjacent permanent magnets of the plurality of permanent magnets.

4. The consequent pole type interior permanent magnet motor of claim 2, wherein each of the plurality of slits is formed such that a first end adjacent to an outer circumferential surface of the rotor and a second end adjacent to a shaft hole of the rotor are blocked.

5. The consequent pole type interior permanent magnet motor of claim 4, wherein the first end of each of the plurality of slits is located closer to the outer circumferential surface of the rotor than one end of each of the respective two adjacent permanent magnets of the plurality of permanent magnets.

6. The consequent pole type interior permanent magnet motor of claim 4, wherein each of the plurality of slits is formed in a rectangular cross-section.

7. The consequent pole type interior permanent magnet motor of claim 2, wherein
   an electrical angle of a slit pitch ($Ps\_elec$) of each slit of the plurality of slits satisfies a relationship as follows:

$0° < Ps\_elec < 34.8°$.

8. The consequent pole type interior permanent magnet motor of claim 2, wherein a width (Wb) of a bridge between an end of each slit of the plurality of slits and an outer circumferential surface of the rotor satisfies a relationship as follows:

$Ct \leq Wb \leq 0.4$ mm $Sl \leq (Do - Di)/2 - Wb*2$ wherein Ct is a thickness of a rotor core, Wb is the width of the bridge, Sl is a length of a slit, Do is an outer diameter of the rotor core, and Di is an inner diameter of the rotor core.

9. The consequent pole type interior permanent magnet motor of claim 2, wherein a width (Wr) of a rib between one side surface of each slit of the plurality of slits and one end of a magnet insertion hole of the rotor satisfies a relationship as follows:

$Ct \leq Wb \leq 0.4$ mm $Sl \leq (Do - Di)/2 - Wb*2$ wherein Ct is a thickness of a rotor core, Wr is a width of the rib, Sl is a length of a slit, Do is an outer diameter of the rotor core, and Di is an inner diameter of the rotor core.

10. The consequent pole type interior permanent magnet motor of claim 1, wherein the stator is a concentrated winding type.

11. The consequent pole type interior permanent magnet motor of claim 1, wherein the respective two adjacent permanent magnets of the plurality of permanent magnets are symmetrically arranged with respect to a corresponding slit of the plurality of slits.

12. The consequent pole type interior permanent magnet motor of claim 11, wherein the respective two adjacent permanent magnets of the plurality of permanent magnets have different polarities from each other.

13. The consequent pole type interior permanent magnet motor of claim 1, wherein a flux barrier is at both ends of each permanent magnet of the plurality of permanent magnets.

14. The consequent pole type interior permanent magnet motor of claim 1, wherein each permanent magnet of the plurality of permanent magnets is formed in a plate shape.

15. The consequent pole type interior permanent magnet motor of claim 1, wherein each permanent magnet of the plurality of permanent magnets is formed in a C-type.

16. The consequent pole type interior permanent magnet motor of claim 1, wherein a distance between the respective two adjacent permanent magnets of the plurality of permanent magnets is less than a distance between the two adjacent permanent magnets, of the plurality of permanent magnets, that have a same polarity.

17. The consequent pole type interior permanent magnet motor of claim 1, further comprising:
   a plurality of magnet insertion holes formed in the rotor, wherein each permanent magnet of the plurality of permanent magnets is accommodated in a magnet insertion hole of the plurality of magnet insertion holes.

18. The consequent pole type interior permanent magnet motor of claim 17, wherein
   two or more permanent magnets, of the plurality of permanent magnets, that have the same polarity, are accommodated in each of two adjacent magnet insertion holes of the plurality of magnet insertion holes, and
   a consequent pole of the consequent poles is formed between the two adjacent magnet insertion holes of the plurality of magnet insertion holes.

* * * * *